US012687672B2

(12) United States Patent
Machielse et al.

(10) Patent No.: US 12,687,672 B2
(45) Date of Patent: Jul. 21, 2026

(54) ALIGNMENT OF ADIABATIC OPTICAL INTERFACES

(71) Applicant: IONQ INC., College Park, MD (US)

(72) Inventors: Bartholomeus Johannes Machielse, Somerville, MA (US); Beibei Zeng, Medford, MA (US); Chawina De-Eknamkul, Cambridge, MA (US); Denis Sukachev, Brookline, MA (US); Daniel Riedel, Cambridge, MA (US)

(73) Assignee: IONQ INC., College Park, MD (US)

( * ) Notice: Subject to any disclaimer, the term of this patent is extended or adjusted under 35 U.S.C. 154(b) by 277 days.

(21) Appl. No.: 18/360,450

(22) Filed: Jul. 27, 2023

(65) Prior Publication Data

US 2025/0102728 A1      Mar. 27, 2025

Related U.S. Application Data

(60) Provisional application No. 63/511,594, filed on Jun. 30, 2023.

(51) Int. Cl.
| *G02B 6/02* | (2006.01) |
| *G02B 6/255* | (2006.01) |

(Continued)

(52) U.S. Cl.
CPC ............. *G02B 6/02* (2013.01); *G02B 6/2555* (2013.01); *G02B 6/262* (2013.01); *G02B 6/3803* (2013.01)

(58) Field of Classification Search
CPC ...... G02B 6/1228; G02B 6/262; G02B 6/305; G02B 6/2555; G02B 6/3803
See application file for complete search history.

(56) References Cited

U.S. PATENT DOCUMENTS 5,581,646 A * 12/1996 Tsukamoto .......... G02B 6/4204
                                                        385/140
6,470,023 B1 * 10/2002 Upton .................. G02B 6/4227
                                                        398/151

(Continued)

FOREIGN PATENT DOCUMENTS

| EP | 0927375 B1 | 2/2002 |
| KR | 20220036647 A | 3/2022 |
| NL | 2025616 B1 | 12/2021 |

OTHER PUBLICATIONS

Michael J. Burek, et al., "Fiber-Coupled Diamond Quantum Nanophotonic Interface," Phys. Rev. Applied 8, 024026—Published Aug. 25, 2017, 2017 American Physical Society, pp. 1-10.

(Continued)

*Primary Examiner* — Paisley L Wilson
(74) *Attorney, Agent, or Firm* — Dickinson Wright PLLC

(57)      ABSTRACT

System and methods for aligning optical elements to form adiabatic couplings are disclosed. An alignment device includes a common platform and a plurality of electrically-controlled mounts affixed to the common platform. Individual fibers of a first set of fibers that are to be aligned with a second set of fibers are coupled into respective ones of the plurality of electrically-controlled mounts. The platform as a whole is positioned in 3D space to align the first set of fibers with the second set of fibers, within a threshold level of alignment. Then, individual ones of the electrically-controlled mounts are adjusted to further align respective fibers of the first set of fibers with a corresponding fiber of the second set. In some embodiments, scattered light and/or signal strength are used as feedback measurements to guide the alignment process.

15 Claims, 24 Drawing Sheets

(51) Int. Cl.
   *G02B 6/26* (2006.01)
   *G02B 6/38* (2006.01)

(56) References Cited

U.S. PATENT DOCUMENTS

| | | | |
|---|---|---|---|
| 2002/0113969 A1 | 8/2002 | Case | |
| 2002/0131729 A1 | 9/2002 | Higgins | |
| 2005/0249464 A1 | 11/2005 | Case | |
| 2018/0267244 A1 | 9/2018 | Grosse | |
| 2018/0314151 A1 * | 11/2018 | Koch | B29D 11/00 |
| 2023/0098658 A1 | 3/2023 | Watte et al. | |

OTHER PUBLICATIONS

U.S. Appl. No. 17/810,288, filed Jun. 30, 2022, Denis Sukachev.
U.S. Appl. No. 17/936,782, filed Sep. 29, 2022, Bartholomeus Johannes Machielse, et al.
U.S. Appl. No. 18/346,084, filed Jun. 30, 2023, Bartholomeus Johannes Machielse, et al.
"Thermo-Optic Characterization of SU-8 at Cryogenic Temperature", Trisha Chakraborty et al, 2022 Conference on Lasers and Electro-Optics (CLEO), OSA, May 15, 2022, p. 1, XP034192073, DOI: 10.1364/CLEO_SI.2022.SF3O.7 (1 page).
International Search and Search Report and Written Opinion of the European Patent Office, PCT/US2024/034483, dated Jun. 27, 2025 (24 pages).
Extended European Search Report for Application No. 26153635.3 mailed May 19, 2026 (9 Pages).

\* cited by examiner electrical port connections 1120 tube connection 1118 optical fiber port connections 1116

1114 packaged quantum memory device 1100 tube 1104 electrical ports 1106 optical fiber ports 1102 cryogenic cooling device 1108

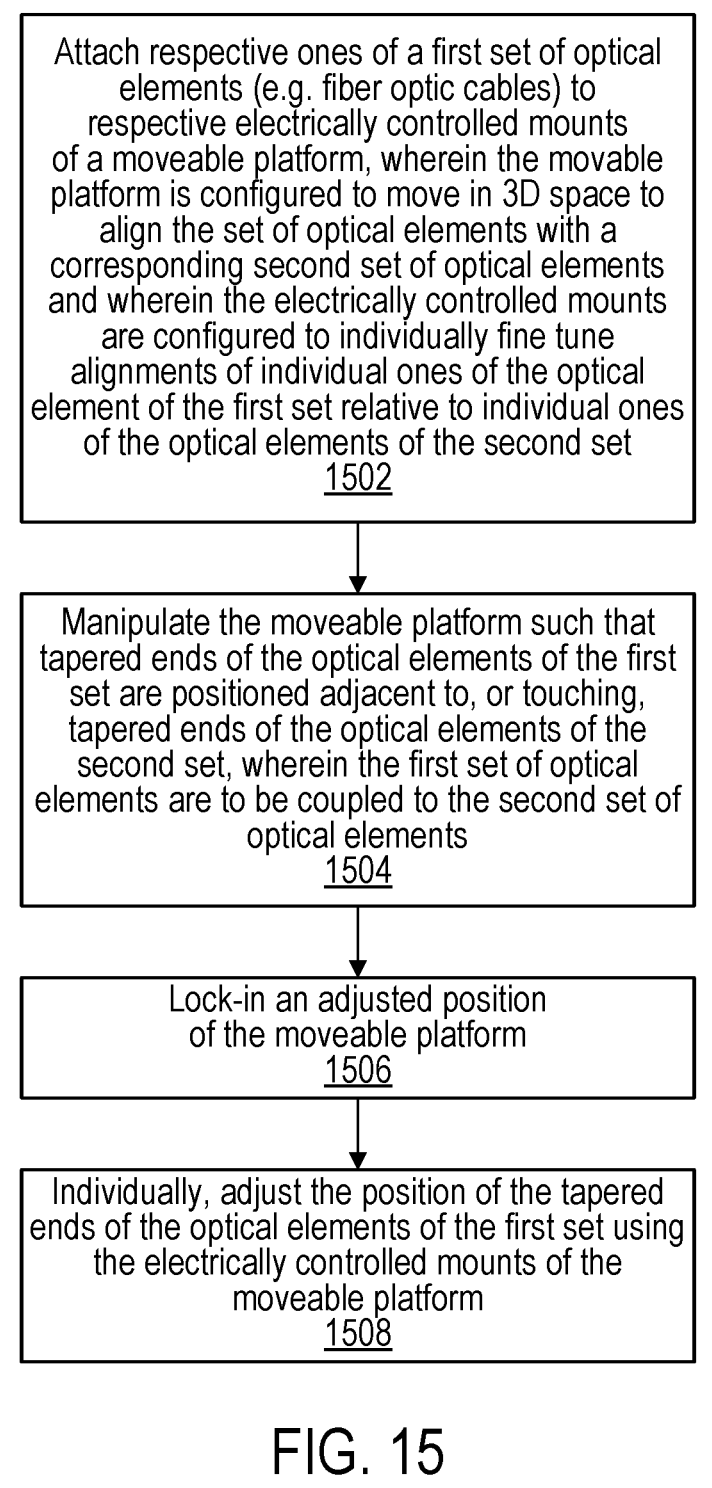

Attach respective ones of a first set of optical
elements (e.g. fiber optic cables) to
respective electrically controlled mounts
of a moveable platform, wherein the movable
platform is configured to move in 3D space to
align the set of optical elements with a
corresponding second set of optical elements
and wherein the electrically controlled mounts
are configured to individually fine tune
alignments of individual ones of the optical
element of the first set relative to individual ones
of the optical elements of the second set
1502

Manipulate the moveable platform such that
tapered ends of the optical elements of the first
set are positioned adjacent to, or touching,
tapered ends of the optical elements of the
second set, wherein the first set of optical
elements are to be coupled to the second set of
optical elements
1504

Lock-in an adjusted position
of the moveable platform
1506

Individually, adjust the position of the tapered
ends of the optical elements of the first set using
the electrically controlled mounts of the
moveable platform
1508

FIG. 15

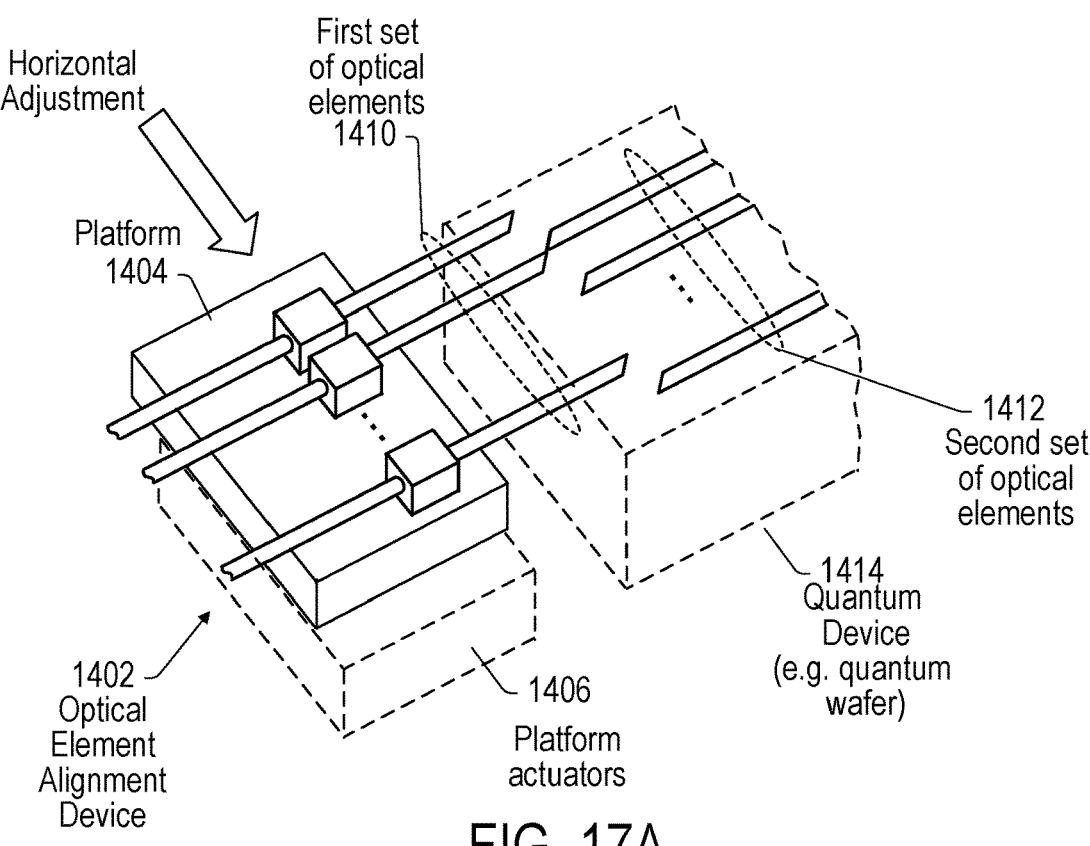

Horizontal
Adjustment

First set
of optical
elements
1410

Platform
1404

1412
Second set
of optical
elements

1402
Optical
Element
Alignment
Device

1406
Platform
actuators

1414
Quantum
Device
(e.g. quantum
wafer)

FIG. 17A

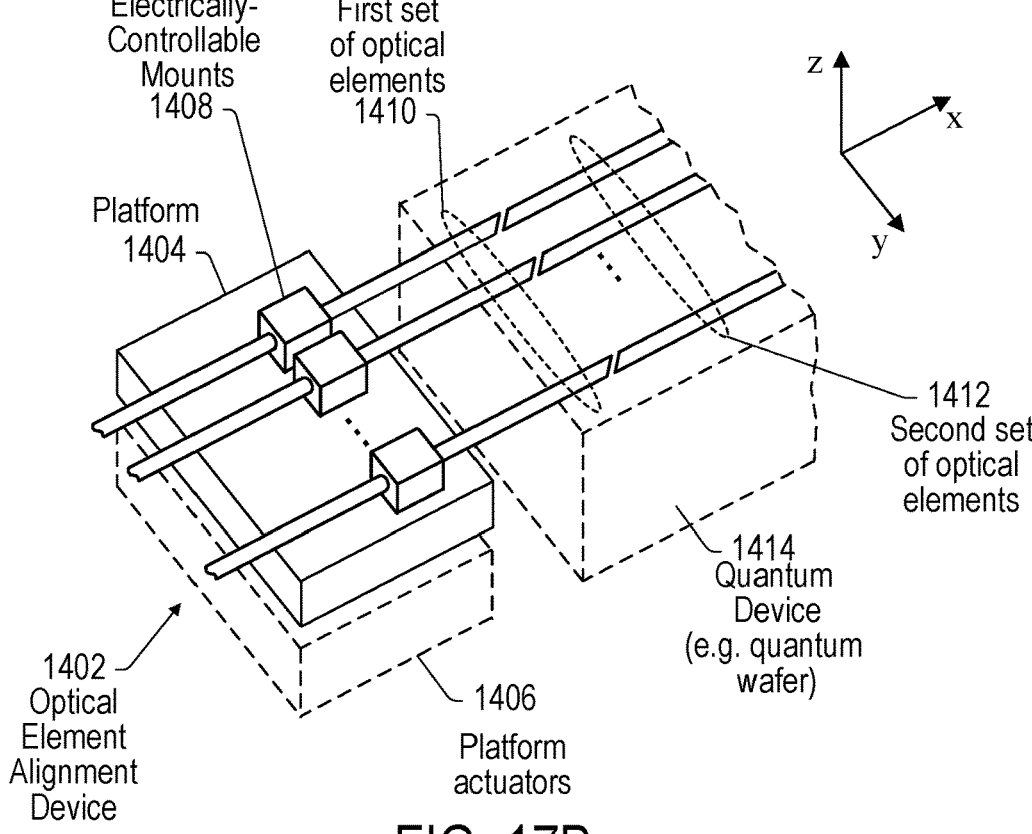

Electrically-
Controllable
Mounts
1408

First set
of optical
elements
1410

Platform
1404

1412
Second set
of optical
elements

1402
Optical
Element
Alignment
Device

1406
Platform
actuators

1414
Quantum
Device
(e.g. quantum
wafer)

FIG. 17B 1440     1442     1444 t=M 1440     1442     1444 t=M+N

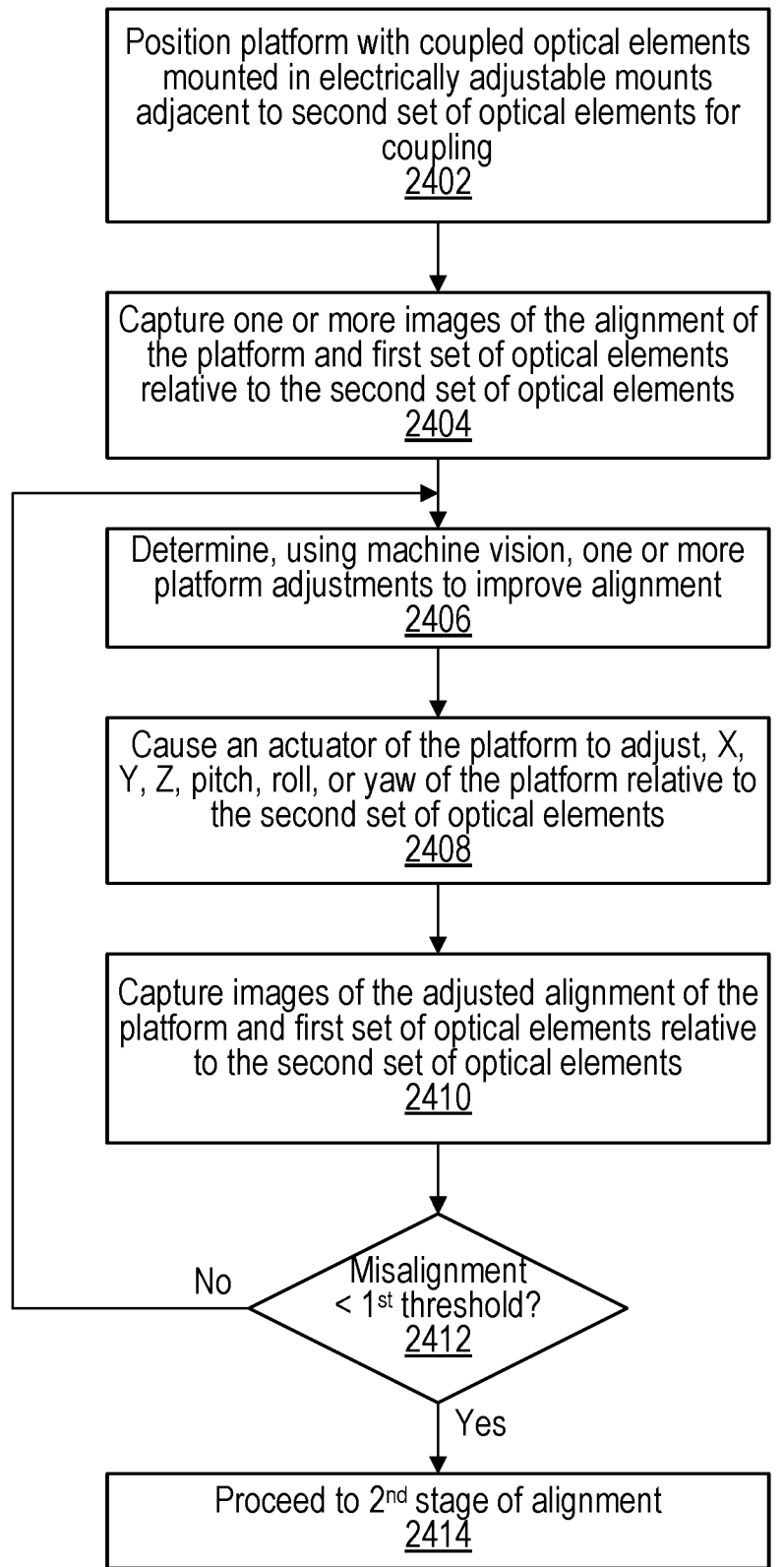

Position platform with coupled optical elements mounted in electrically adjustable mounts adjacent to second set of optical elements for coupling
2402

Capture one or more images of the alignment of the platform and first set of optical elements relative to the second set of optical elements
2404

Determine, using machine vision, one or more platform adjustments to improve alignment
2406

Cause an actuator of the platform to adjust, X, Y, Z, pitch, roll, or yaw of the platform relative to the second set of optical elements
2408

Capture images of the adjusted alignment of the platform and first set of optical elements relative to the second set of optical elements
2410

Misalignment < 1st threshold?
2412

No

Yes

Proceed to 2nd stage of alignment
2414

FIG. 24

ALIGNMENT OF ADIABATIC OPTICAL INTERFACES

RELATED APPLICATION

This application claims benefit of priority to U.S. Provisional Application Ser. No. 63/511,594, entitled "Alignment of Adiabatic Optical Interfaces," filed Jun. 30, 2023, and which is incorporated herein by reference in its entirety.

BACKGROUND

Quantum computing utilizes the laws of quantum physics to process information. Quantum physics is a theory that describes the behavior of reality at the fundamental level. It is currently the only physical theory that is capable of consistently predicting the behavior of microscopic quantum objects (e.g., particles) like photons, molecules, atoms, and electrons.

A quantum computing device is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply, a qubit, is a list of two complex numbers, where the sum of squared absolute values of the complex numbers (e.g., $|x|^2+|y|^2$) must sum to one. Each of the two complex numbers (e.g., x and y) is called an amplitude, and their respective quasi-probabilities are the squared absolute values of the complex numbers (e.g., $|x|^2$ and $|y|^2$, respectively). Hence, the square of the absolute value of each complex number corresponds to the probability of event zero or event one happening. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computing devices are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

There are different types of qubits that may be used in quantum computers, each having different advantages and disadvantages. For example, some quantum computers may include qubits built from superconductors, trapped ions, semiconductors, photons, etc. Each may experience different levels of interference, errors and decoherence. Also, some may be more useful for generating particular types of quantum circuits or quantum algorithms, while others may be more useful for generating other types of quantum circuits or quantum algorithms.

BRIEF DESCRIPTION OF THE DRAWINGS

FIG. 15 is a flow diagram illustrating steps of a process for aligning tapered ends of a first set of optical elements with tapered ends of a second set of optical elements using an optical element alignment device comprising a movable platform and individual electrically-controllable optical element mounts included on the movable platform, according to some embodiments.

FIGS. 17A-17B illustrate a movable platform of an optical element alignment device being adjusted horizontally to align tapered ends of a first set of optical elements with tapered ends of a second set of optical elements, according to some embodiments.

FIG. 24 is a flow diagram illustrating steps of a first stage of a process for aligning tapered ends of a first set of optical elements with tapered ends of a second set of optical elements using an optical element alignment device, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods, apparatuses, and systems for aligning ends of optical elements and/or securing the aligned ends of the optical elements. For example, a first optical element, such as a fiber optic cable, may need to be aligned with a second optical element, such as a waveguide of a quantum memory. This may be necessary in order to configure an optical device, such as the quantum memory, to receive photons, such as entangled photons indicting quantum information to be stored in the quantum memory. Also, continuing the example, the aligned optical elements (e.g., fiber optic cable and waveguide) may need to be secured in order to maintain the alignment while experiencing various changes in conditions, such as changes in thermal conditions or mechanical shocks. In some embodiments, the processes described herein may provide the needed end alignments and securing structures to ensure that signal losses at an interface of aligned optical elements is minimal. Also, the processes described herein may ensure that outside conditions such as temperature changes or mechanical shocks do not significantly alter alignment or otherwise cause high signal losses for aligned tapered ends of optical elements. In some embodiments, the methods, apparatuses, and systems described herein may be used to align and secure optical elements of quantum devices, such as the quantum memory example described above, but also may more generally be used to align and secure optical elements of various other types of devices that take light as an input or that provide light signals as an output.

Structures for Securing Aligned Optical Elements

Figure 1:
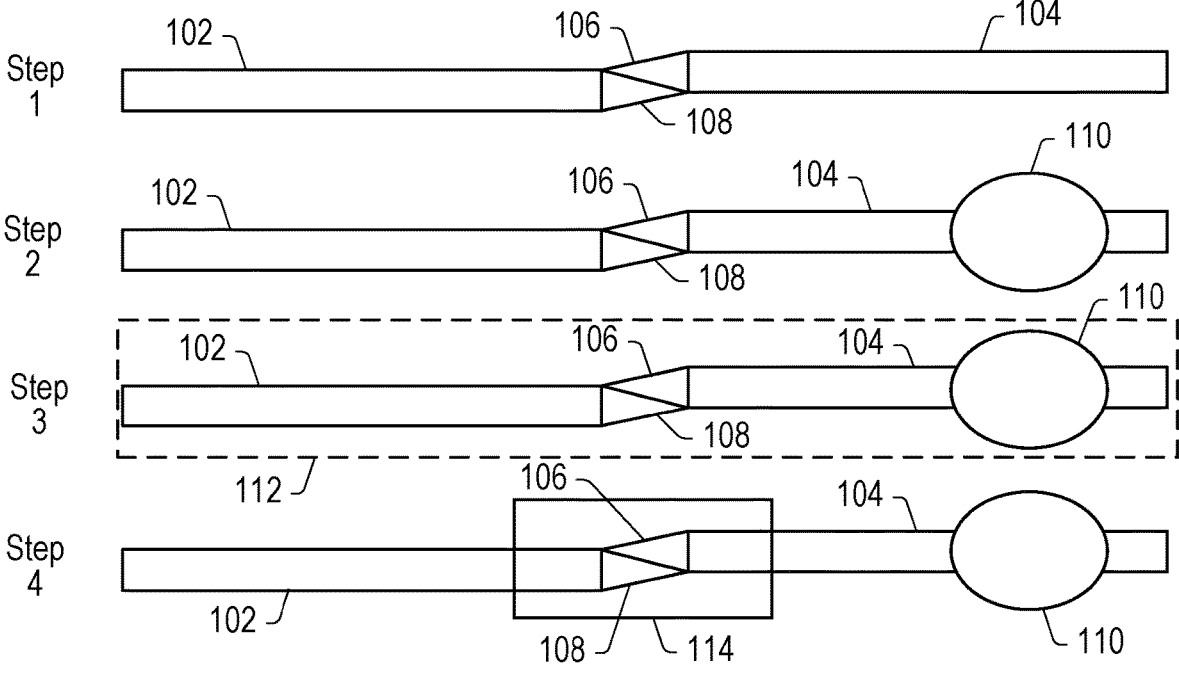
FIG. 1 is a block diagram illustrating a process of securing aligned tapered ends of optical elements that form an adiabatic coupling, wherein the process incudes securing at least one of the optical elements to an optical device structure via an adhesive and using a photo active material and photo-lithography to form an additional securing structure over the aligned tapered ends, according to some embodiments.
Figure 2:
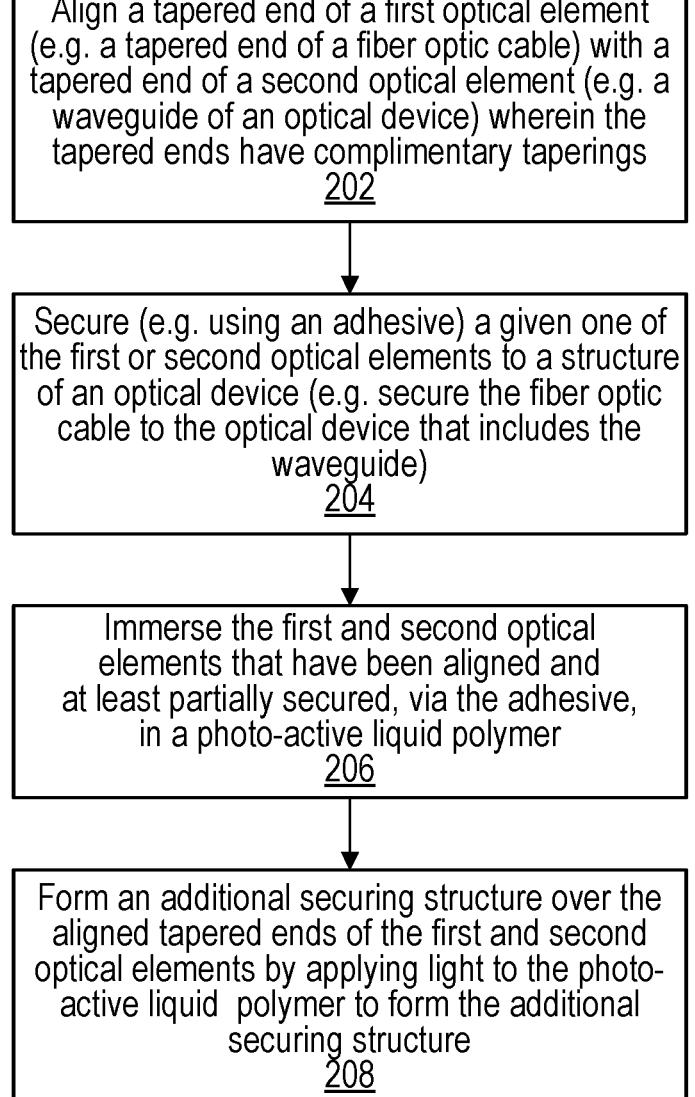
FIG. 2 is a flow diagram illustrating steps of a process for securing aligned tapered ends of optical elements using a securing structure formed using a photo active material and photo-lithography, according to some embodiments.

FIG. 1 is a block diagram illustrating a process of securing aligned tapered ends of optical elements that form an adiabatic coupling, wherein the process incudes securing at least one of the optical elements to an optical device structure via an adhesive and using a photo active material and photo-lithography to form an additional securing structure over the aligned tapered ends, according to some embodiments. Also, FIG. 2 is a flow diagram illustrating steps of a process for securing aligned tapered ends of optical elements using a securing structure formed using a photo active material and photo-lithography, according to some embodiments.

In some embodiments, a first step for forming a secure coupling between optical elements includes aligning a tapered end of a first optical element with a tapered end of a second optical element, wherein the tapered ends of the first and second optical elements have complimentary taperings. For example, at step 1 of FIG. 1 and block 202 of FIG. 2, tapered end 108 of optical element 102 is aligned with tapered end 106 of optical element 104.

Figures 9A, 9B:
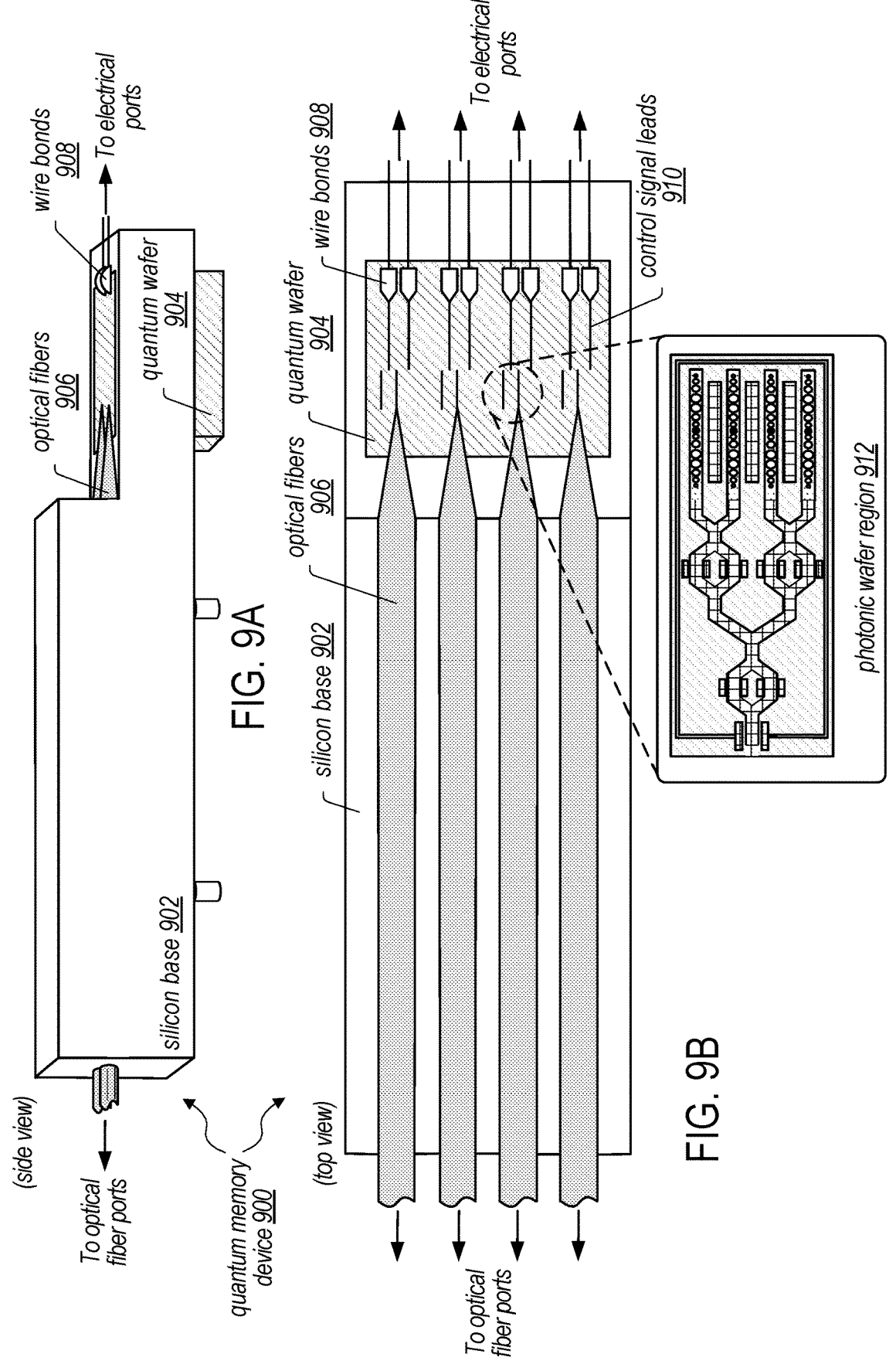
FIGS. 9A-9B illustrate an example implementation of an optical device, such as a quantum memory device (e.g., a quantum repeater), into which light may be transported via adiabatically coupled optical elements secured using a securing structure formed using photo-activated lithography, according to some embodiments.

A next step for forming a secure coupling between optical elements includes securing a given one of the first or second optical elements to a structure of an optical device, wherein said securing is performed by applying an adhesive to the given first or second optical element to secure it to the structure of the optical device. For example, at step 2 of FIG. 1 and block 204 of FIG. 2, optical element 104 is secured to a structure of an optical device using adhesive 110. In some embodiments, optical element 102 may be a waveguide of an optical device, such as the waveguides shown on quantum wafer 904 in FIG. 9. Also, the optical element 104 may be an optical fiber 104 as shown in FIG. 9. In some embodiments, adhesive 110 may secure the optical element 104 to a base or other structure of the optical device such as silicon base 902 of quantum memory device 900 shown in FIG. 9B. In some embodiments, adhesive 110 may be an ultraviolet (UV) light curable resin, such as an epoxy, that hardens when UV light is applied. In some embodiments, adhesive 110 may secure a loose optical element, such as a fiber optic cable, to an optical device the loose optical element is being attached to. For example, a fiber optic cable attached to a quantum memory may first be secured by adhesive 110. The adhesive may provide good structure for securing the optical element, but may not be suitable for securing the alignment of the optical elements 102 and 104 through mechanical shocks or thermal shocks, as a few examples. Thus, as described for steps 3 and 4, an additional securing structure 114 may be added.

Figure 3:
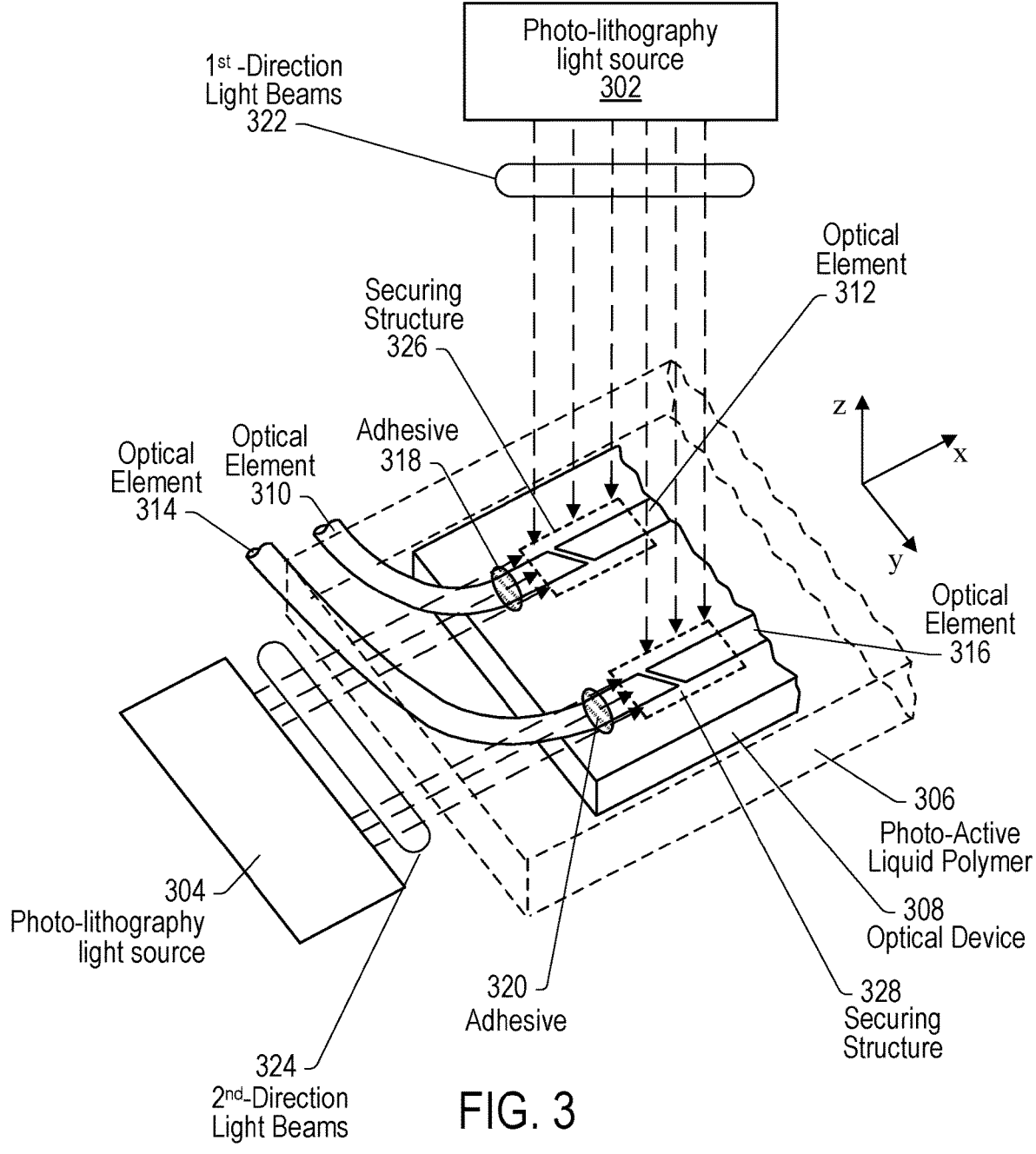
FIG. 3 is a block diagram illustrating photo-activated lithography being performed to form a securing structure over aligned tapered ends of adiabatically coupled optical elements, according to some embodiments.

To form the additional securing structure, at step 3 of FIG. 1 and block 206 of FIG. 2, the aligned optical elements 102 and 104 with adiabatically coupled tapered ends 106 and 108 are immersed in a photo-active liquid polymer 112. Also, at step 4 of FIG. 1 and block 208 of FIG. 2, light is directed into the photo-active liquid polymer 112 to form the additional securing structure 114. For example, in some embodiments, two-photon lithography (as shown in FIG. 3) may be used. The additional securing structure 114 is formed over the aligned tapered ends of the first and second optical elements (e.g., ends 106 and 108) by applying photons of light to the photo-active liquid polymer to form the additional securing structure 114.

In some embodiments, the optical elements adiabatically coupled and secured via adhesive 110 and additional securing structure 114 may have a signal loss of approximately 0.5 dB or less. Also, the coupled aligned optical elements may be configured to be cooled to 70 degrees Kelvin or less without losing alignment (and therefore without appreciably increasing signal loss).

FIG. 3 is a block diagram illustrating photo-activated lithography being performed to form a securing structure over aligned tapered ends of adiabatically coupled optical elements, according to some embodiments.

In some embodiments, at least a portion of optical device 308 is immersed in photo-active polymer 306, wherein sets of coupled optical elements are secured to the optical device 308. For example, optical element 310 is secured to optical device 308 via adhesive 318 and is coupled to optical element 312, which is part of optical device 308. In a similar manner, optical element 314 is secured to optical device 308 via adhesive 320 and is coupled to optical element 316, which is part of optical device 308.

To form the securing structures 326 and 328, light beams 322 and light beams 324, from photo-lithography light source 302 and photo-lithography light source 304, respectively, are directed to the appropriate locations along the coupled optical elements where the securing structures are to be formed. In some embodiments, two-photon lithography is used. In such techniques, the photo-active liquid polymer 306 only hardens at points where two photons intersect, such as where light beams 322 directed in a first direction intersect light beams 324 directed in a second direction. In some embodiments, the first and second directions may be orthogonal to one another (for example vertical and horizontal). This technique may allow for precise placement of the securing structures 326 and 328 and/or precise forming of shapes of the securing structures 326 and 328, such as a cylindrical shape as shown in FIG. 5 or an inverse hour glass shape as shown in FIG. 6.

Figure 4:
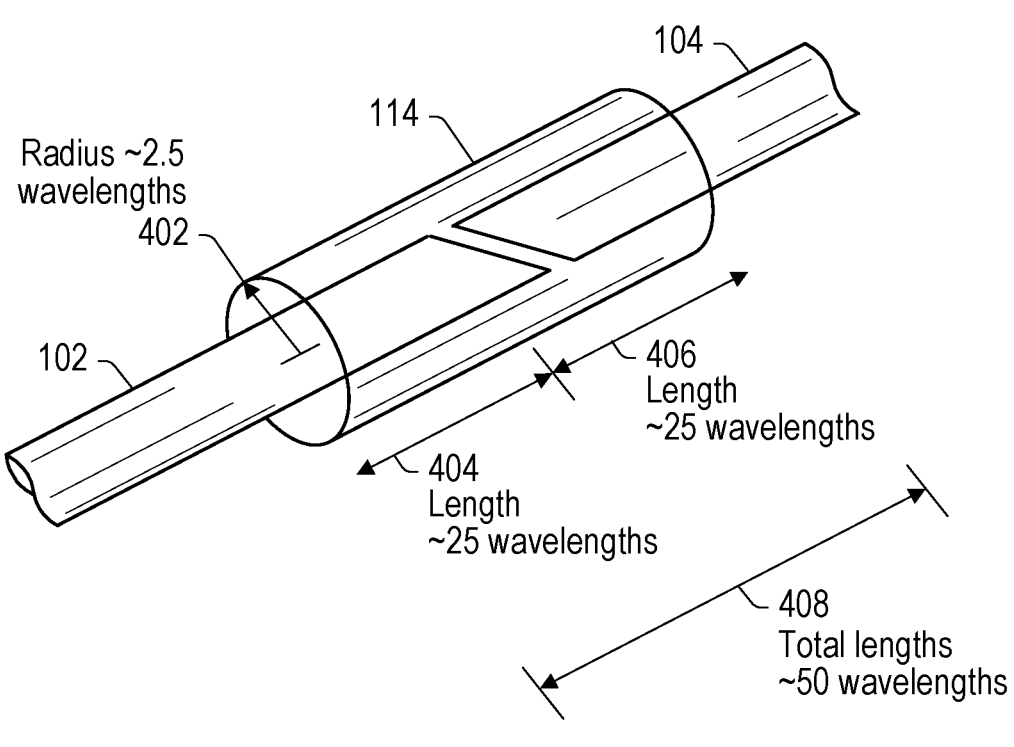
FIG. 4 is a perspective view of an example securing structure for securing adiabatically coupled optical elements formed using a photo active material and photo-lithography, according to some embodiments.

FIG. 4 is a perspective view of an example securing structure for securing adiabatically coupled optical elements formed using a photo active material and photo-lithography, according to some embodiments.

In some embodiments, a securing structure 114 may have a length that extends from the adiabatic coupling interface in either direction, such as shown in FIG. 4 for lengths 404 and 406. In some embodiments lengths 404 and 406 may be centered on the adiabatic coupling interface and have a combined length 408. In some embodiments, lengths 404 and 406 may be approximately 50 or less wavelengths long, such as approximately 25 wavelengths long, wherein the wavelength referred to in the measurement of the lengths 404 and 406 is a wavelength of light transmitted via optical elements 102 and 104. Also, the securing structure 114 may have an overall length 408 of approximately 100 wavelengths or less, and in some embodiments have a 50 wavelengths overall length. Though in some embodiments, other length and diameter dimensions may be used. In some embodiments, the diameter and/or length may be selected to provide sufficient structural support, without causing appreciable discontinuities that affect the light being transmitted via optical elements 102 and 104. For example, an abrupt and significant change in diameter of a shielding of the optical elements 102 and/or 104 may cause a nick that may scatter light. In some embodiments, the thickness of securing structure 114 is selected to provide sufficient structural support without causing light scattering, for example due to nicks. For example, in some embodiments radius 402 may be approximately 10 wavelengths or less, such as approximately 2.5 wavelengths and an outer diameter of securing structure 114 may be approximately 20 wavelengths or less, such as approximately 5 wavelengths in diameter.

Figure 5:
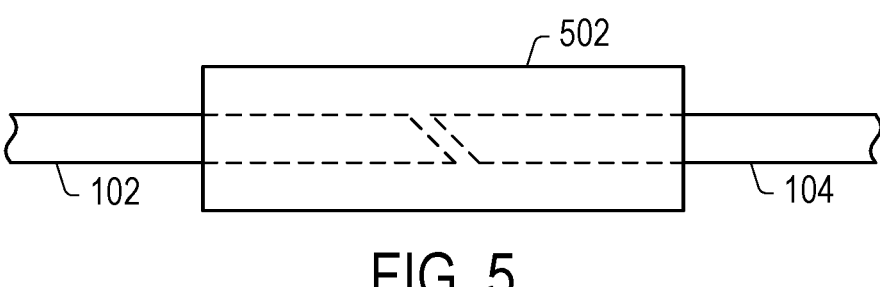
FIG. 5 illustrates a side-view of an example securing structure having a cylindrical outer shape, according to some embodiments.
Figure 6:
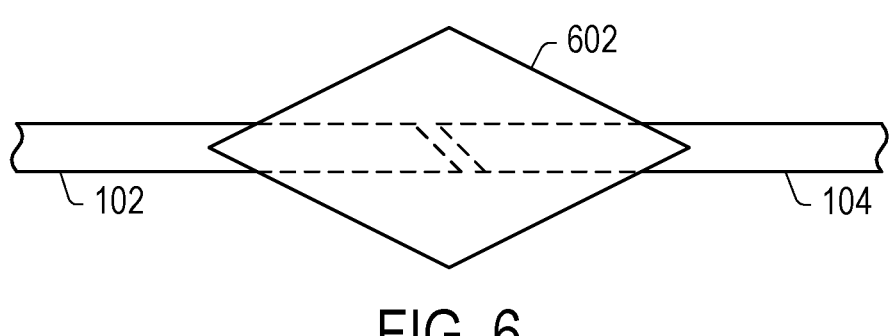
FIG. 6 illustrates a side-view of an example securing structure having an inverse hour-glass shape, according to some embodiments.

FIG. 5 illustrates a side-view of an example securing structure having a cylindrical outer shape and FIG. 6 illustrates a side-view of an example securing structure having an inverse hour-glass shape, according to some embodiments.

For example, securing structure 114 may have a cylindrical shape 502 as shown in FIG. 5 or securing structure 114 may have an inverse hour glass shape 602 as shown in FIG. 6. For example, a securing structure 114 may have a cylindrical shape 502 centered on the aligned tapered ends of the first and second optical elements 102 and 104. Also, as another example, a securing structure 114 may have a varying radius that forms an inverse hour glass shape 602, wherein a thicker center portion of the inverse hour glass shape is aligned with the aligned tapered ends (e.g., 106 and 108) of the first and second optical elements 102 and 104, and wherein the thickness of the additional securing structure tapers down in either direction from the thicker center portion, such as shown in FIG. 6.

Figure 7:
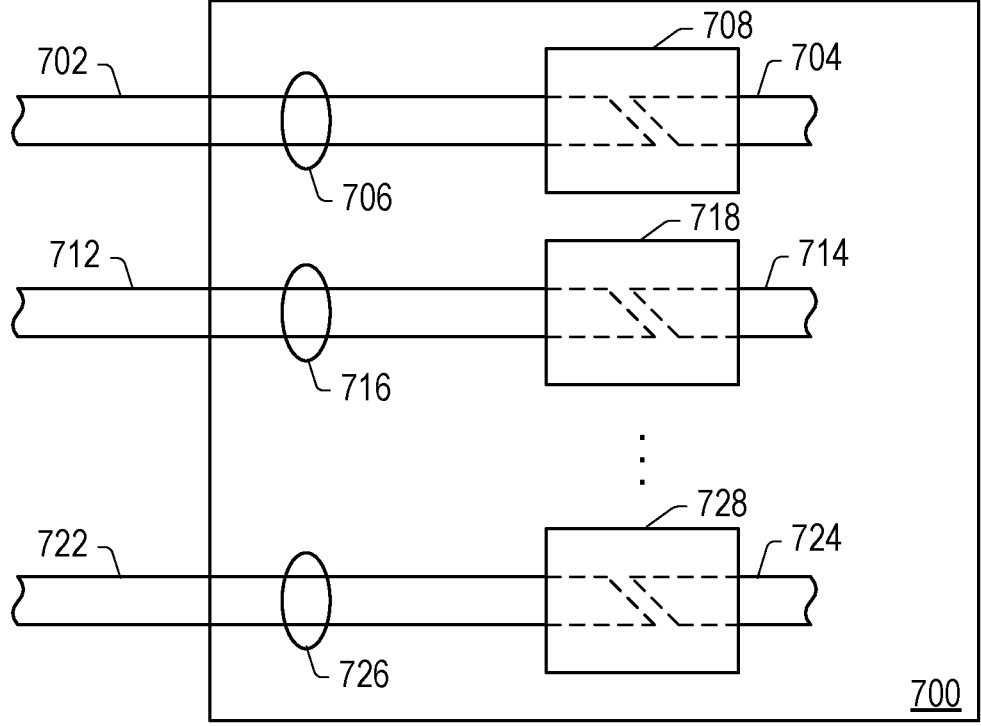
FIG. 7 illustrates a top view of an optical device comprising a set of optical elements adiabatically coupled to another set of optical elements, wherein securing structures formed via photo-activated lithography are securing the sets of adiabatically coupled optical elements, according to some embodiments.

In some embodiments, multiple pairs of optical elements connected to a same optical device may be secured with securing structures as described herein. For example, FIG. 7 illustrates a top view of an optical device comprising a set of optical elements adiabatically coupled to another set of optical elements, wherein securing structures formed via photo-activated lithography are securing the sets of adiabatically coupled optical elements, according to some embodiments.

Figure 13:
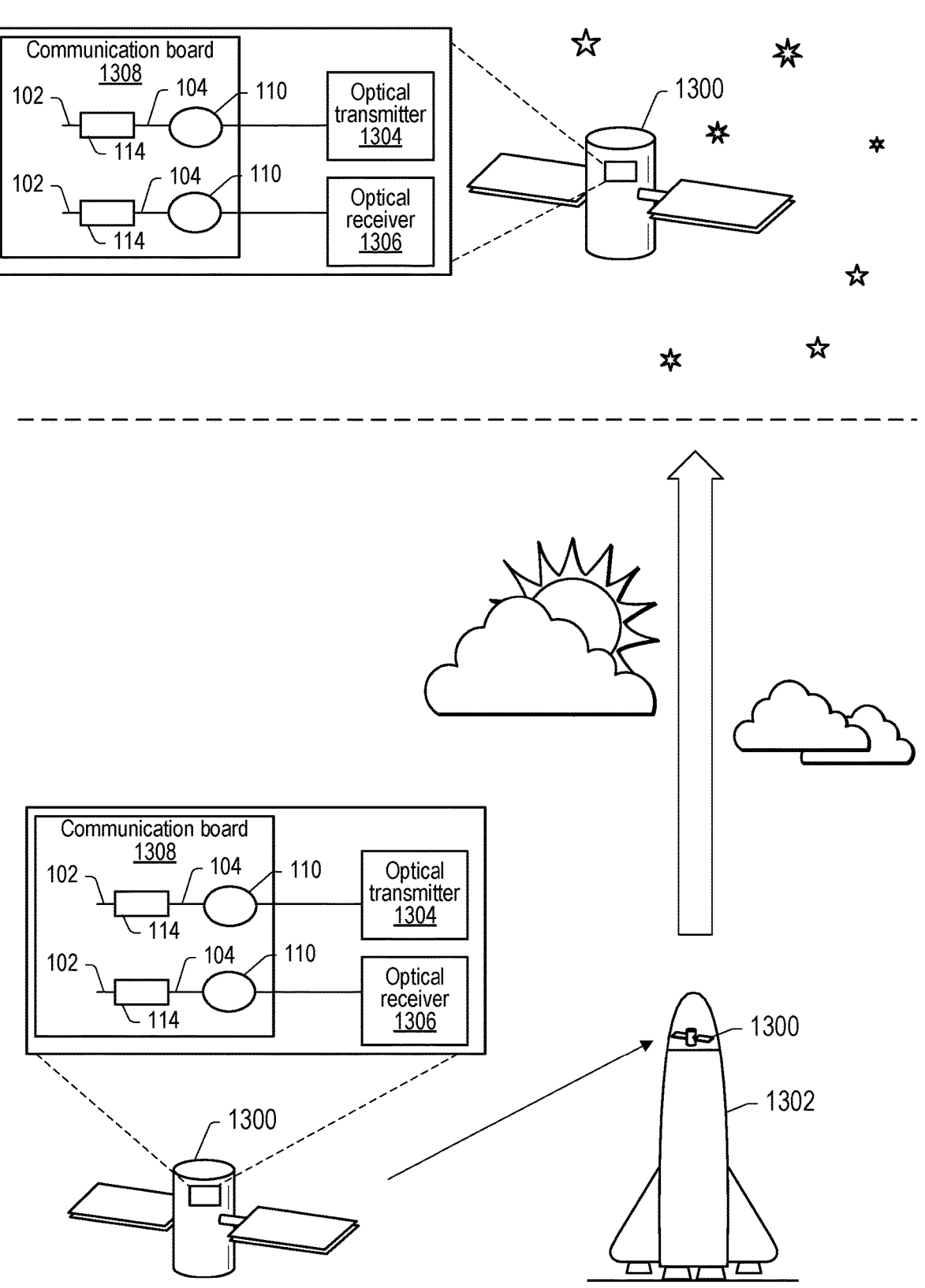
FIG. 13 illustrates an example implementation of an optical device, such as in a satellite communication system, which may include adiabatically coupled optical elements secured using a securing structure formed using photo-activated lithography, according to some embodiments.

In some embodiments, optical device 700 includes optical elements 704, 714, and 724, which are being coupled to optical elements 702, 712, and 722, respectively. The optical elements 702, 712, and 722 are secured to optical device 700 via adhesive applications 706, 716, and 726, respectively. Also, the pairs of optical elements are secured at the adiabatic coupling region via respective securing structures 708, 718, and 728, which may be formed using photo-activated lithography, such as described in FIG. 3. More particularly, as further described with regard to FIG. 8, optical device 700 may be a photonic wafer that is part of a quantum memory or quantum repeater, and the optical elements being coupled to optical device 700 may be fiber optic cables connected to the photonic wafer. As an example, a securing structure as described herein may be used to secure a fiber optic cable to a waveguide of an optical device, such as at a waveguide/optical fiber interface. Also, as shown in FIG. 13, a securing structure as described herein may be used to secure optical connections, such as in satellites that undergo mechanical vibrations and temperature changes when launched into space.

Figure 8:
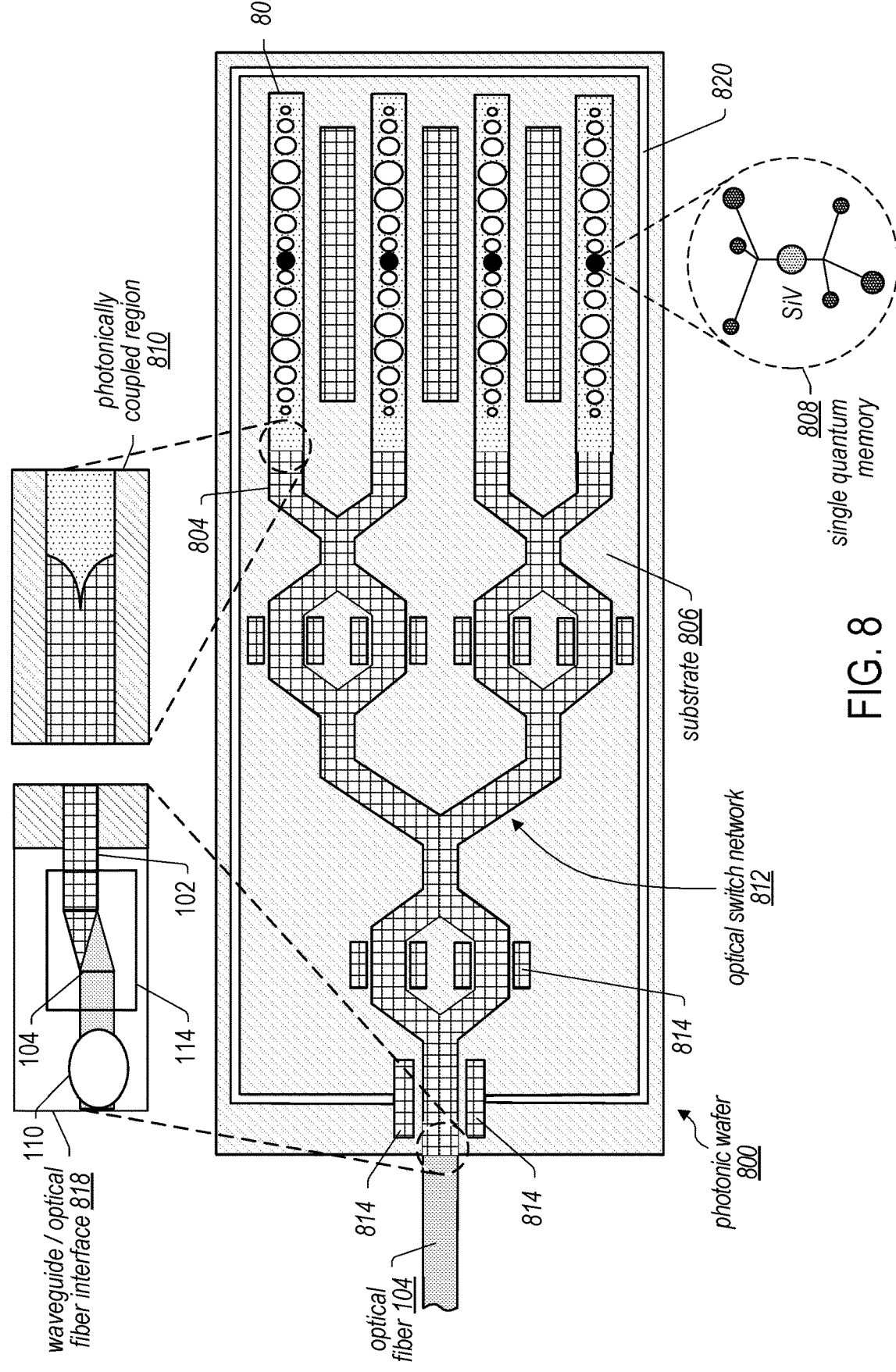
FIG. 8 illustrates an example implementation of an optical device into which light may be transported via adiabatically coupled optical elements secured using a securing structure formed using photo-activated lithography, according to some embodiments.

FIG. 8 illustrates an example implementation of an optical device into which light may be transported via adiabatically coupled optical elements secured using a securing structure formed using photo-activated lithography, according to some embodiments.

In some embodiments, photonic wafer 800 may be used to transfer light between optical fiber 102 and respective quantum memories which may be patterned into photonic waveguide layer 802. In some embodiments, a process for fabricating at least some regions of photonic wafer 800 may use a starting stack, comprising substrate 806, and photonic waveguide layer 802, and photonic waveguide layer 804, may be patterned, resulting in the components shown in FIG. 8. For example, photonically coupled region 810 may represent a region of photonic wafer 800 at which light may be transferred between photonic waveguide layer 804 and photonic waveguide layer 802. As shown in FIG. 8, the two photonic waveguide layers of photonically coupled region 810 have been tapered to allow for evanescent coupling. In contrast, waveguide/optical fiber interface 818 may represent a region of photonic wafer 800 at which light may be transferred between optical fiber 104 and photonic waveguide layer 804. In some embodiments, optical fiber 104 may interface with photonic waveguide layer 804 using adiabatic coupling, wherein tapered end 108 of optical fiber 104 contacts tapered end 106 of waveguide element 102. In some embodiments, van der waals attraction forces may initially hold the tapered ends 106 and 108 together while securing structure 114 is being applied. Also, adhesive 110 may secure optical fiber 104 to substrate 806.

In some embodiments, an optical switch network, such as optical switch network 812, may be patterned into a material used to fabricate photonic waveguide layer 804. Optical switch network 812 may be used to route photons between waveguide/optical fiber interface 818 and photonically coupled region 810. It may be advantageous to design photonic wafer 800 such that a single optical fiber services many individual quantum memories, as shown in FIG. 8, and addressing incoming photons using optical switch network 812 enables photonic wafer 800 to be a densely packaged device. In some embodiments, patterning optical switch network 812 into photonic waveguide layer 804 may be done in various ways. For example, in some embodiments in which the material for photonic waveguide layer 804 is selected for its electrooptic properties, it may be advantageous to maintain the photon in photonic waveguide layer 804 until the moment it is necessary to transfer the light into photonic waveguide layer 802 (e.g., storage in a given quantum memory patterned into photonic waveguide layer 802).

Photonic wafer 800 may be configured to receive photons in a superposition state (e.g., via optical fiber 104) to an on-wafer storage (e.g., respective quantum memories patterned into photonic waveguide layer 802 such as single quantum memory 808). In some embodiments, quantum memories patterned into photonic waveguide layer 802 may be coupled to nanophotonic cavities, such as the nanophotonic cavity shown in single quantum memory 808, which illustrates a silicon vacancy in diamond structure. In such embodiments, the silicon vacancies are embedded into nanophotonic cavities within photonic waveguide layer 802, which may be diamond in such cases. A silicon vacancy in diamond structure, such as single quantum memory 808 demonstrated in FIG. 8, may act as a quantum memory, and a corresponding nanophotonic cavity (e.g., patterned with diamond, etc.) may allow light to interface with said silicon vacancy in diamond structure. In other embodiments, however, quantum memories patterned into photonic waveguide layer 802 may resemble other structures embedded into photonic waveguide layer 802, such as nitrogen-vacancy in diamond, trapped atoms, ensemble doped crystals, atomic vapors, silicon carbide emitters, single rare earth dopants, trapped ions, superconducting qubits, quantum dots in gallium arsenide, defect centers in silicon or other semiconducting materials, etc. Furthermore, different types of quantum memories may be embedded into respective portions of photonic waveguide layer 802, and in some embodiments as shown in FIG. 9B, different materials may be used to respective photonic wafer regions (e.g., photonic wafer region 912) of quantum wafer 904, allowing respective photonic waveguide layers to be patterned according to a given quantum memory architecture.

In some embodiments wherein photonic wafer 800 may be used within a quantum memory device, such as quantum memory device 900 (e.g., for use as a quantum network node for quantum entanglement distribution), photonic wafer 800 may be configured to store a first received entangled particle of a first pair of entangled particles in a first single quantum memory 808 of photonic waveguide layer 802 and also store a second received entangled particle of a second pair of entangled particles in a second single quantum memory 808 of photonic waveguide layer 802.

Photonic wafer 800 (or a quantum measurement device connected to photonic wafer 800 either inside or outside of quantum memory device 900) may further be configured to perform one or more joint measurements on the first and second particles without collapsing superposition states of the first and second entangled particles. The joint measurements may determine a correlation relationship between the superposition states of the entangled particles such that entanglement can be extended between the pairs of entangle particles.

In some embodiments, quantum memories within photonic waveguide layer 802 may be heralded, meaning that when a particle arrives and is stored in a single quantum memory such as single quantum memory 808, a quantum measurement device issues a heralding signal announcing the arrival of the particle. In some embodiments, such a heralding signal may be issued via optical fiber 104, and may be used to trigger operation of an optical switch within optical switch network 812 in order to align the next pathway within optical switch network 812 for routing the next incoming particle to a respective quantum memory of photonic waveguide layer 802. Also, while not shown, in some embodiments, photonic wafer 800 may comprises multiple sets of optical switch networks and associated waveguide layers 802 and quantum memories 808. For example, each of the optical fibers 702, 712, and 722, shown in FIG. 7, may connect to an optical switching network with associated wave guides and quantum memories as shown in FIG. 8.

In some embodiments, photonic wafer 800 may further include a conversion interface (e.g., nonlinear optics elements 814). For example, in some embodiments, a conversion interface (e.g., nonlinear optics elements 814) may convert a transmission frequency of a received photonic particle to a different frequency prior to storage of the particle in a given quantum memory within photonic waveguide layer 802. For example, in some embodiments, fiber optical links (e.g., optical fiber 104) may transmit photonic particles using different frequencies and such variations may be adjusted via a conversion interface of photonic wafer 800. As another example, particles received at photonic wafer 800 via optical ground stations and/or particles received at photonic wafer 800 via fiber links may be transmitted at different wavelengths and a conversion interface of photonic wafer 800 may convert the wavelength of the received particles to a wavelength used by a given single quantum memory, such as single quantum memory 808, to store quantum particles in said memory. In some embodiments, nonlinear optics elements 814, as shown in FIG. 8, may also provide phase shifting, amplitude modulation, and/or other functionalities with respect a received particle, and/or any other interfacing property that may be required in terms of manipulating an incoming particle before routing the particle to storage on photonic wafer 800. Furthermore, as shown in FIG. 8, nonlinear optics elements 814 may also be fabricated using a same material as the material used to fabricate photonic waveguide layer 804, according to some embodiments.

FIGS. 9A-9B illustrate an example implementation of an optical device, such as a quantum memory device (e.g., a quantum repeater), into which light may be transported via adiabatically coupled optical elements secured using a securing structure formed using photo-activated lithography, according to some embodiments.

In some embodiments, quantum memories may provide a method of receiving, storing, and providing quantum information. In some cases, quantum memories may be deployed for use in large-scale optical fiber networks and/or quantum entanglement networks, for example as quantum repeaters, that store and effectively connect distributed entangled particles to provide secure, long-distance communications. In such applications, quantum memory device 900 may function to control the tuning (e.g., adjustments to the local electrical, optical, thermal, electromechanical environment) of quantum memories housed within quantum memory device 900.

In some embodiments, a quantum memory device, such as quantum memory device 900, may comprise quantum memories and quantum memory control devices. Note that for ease of illustration, some embodiments of the following description are given in terms of quantum memory device 900 resembling a quantum repeater. However, in some embodiments, a quantum memory device, as described herein in FIGS. 9A-9B, may be used for other purposes, such as storing quantum information locally at a given location. For example, in some situations, quantum memory device 900 may be used to store quantum information (such as in a cache) that is used by multiple locally situated quantum computers. As seen in FIGS. 9A-9B, quantum wafer 904 may house quantum memories via photonic wafer regions such as photonic wafer region 912. Photonic wafer region 912 may resemble photonic wafer 800 and the functionalities for photonic wafer 800 (e.g., routing light between an optical fiber and respective quantum memories of photonic wafer 800) described herein.

Quantum memory control devices of quantum memory device 900 may, for example, provide mechanisms for receiving and routing quantum information (e.g., entangled particles) to be stored in the quantum memories of quantum wafer 904. In another example, quantum memory control devices may provide mechanisms for receiving, sending, emitting, and/or controlling optical and/or electrical control signals to, or from, quantum wafer 904. In yet another example, quantum memory control devices may modify the behavior of the quantum memories on quantum wafer 904 via the use of low-frequency control signals (e.g., microwave, RF, and/or DC control signals) that may induce strain on the quantum memories. Quantum memory control devices may additionally control heat and/or gas flow onto quantum wafer 904. Quantum memory control devices may also be used to deliver electrical control signals that result in the creation of local electromechanical strain fields near the quantum memories of quantum wafer 904, according to some embodiments. Such electromechanical strain fields may, for example, enable for the tuning of optical and/or spin properties of quantum memories on quantum wafer 904 for improved performance and operation of said quantum memories. This may be referred to as strain tuning of the quantum memories, according to some embodiments.

The placements and interactions of the quantum memories and some quantum memory control devices within quantum memory device 900 may resemble embodiments shown in the side and top view of quantum memory device 900 in FIGS. 9A and 9B, respectively. In some embodiments, quantum memory device 900 may additionally include optical fiber ports and/or electrical ports that provide access points between optical fiber cables, control signal leads, electrical wires, electrical cables, etc., located external to quantum memory device 900, and quantum wafer 904.

In some embodiments, quantum memory device 900 may include a base material, such as silicon base 902, onto which quantum wafer 904 may be bonded/attached. In some embodiments, as shown in FIGS. 9A-9B, the base material is silicon. However, it should be understood by a person having ordinary skill in the art that the base material could be another material that provides similar functionalities as silicon base 902 (e.g., another semiconducting material). In some embodiments, optical fibers, such as optical fibers 906, may be inserted into grooves or through-holes embedded inside silicon base 902. For example, optical fibers 104 as shown in FIG. 1 may be inserted into grooves or through-holes embedded inside silicon base 902. As shown in FIG. 9B, optical fibers 906 may be coupled to quantum wafer 904 and to optical fiber ports of quantum memory device 900. In some embodiments, an adhesive 110 (as shown in FIG. 1) may secure the optical fibers to silicon base 902 and a securing structure 114 (as shown in FIG. 1) may secure the optical fibers to the wave guides of the quantum wafer 904. Silicon base 902 may house several rows of optical fibers, according to the depth of silicon base 902, that are fit into grooves. Silicon base 902 may also be bonded (e.g., soldered) to quantum wafer 904 (e.g., via indium bumps). In some embodiments, optical fibers 906 may be referred to as "tapered" optical fibers due to their needle-point shape, as shown in FIG. 9B.

In some embodiments, wire bonds, such as wire bonds 908 (e.g., soldering points), may be used to connect control signal leads 910 to electrical ports of quantum memory device 900. Electrical connections to quantum wafer 904 may also be fabricated using a "flip chip" method, according to some embodiments. In such embodiments, a "flip chip" layer may enable routing of electrical signals with complex topologies to quantum wafer 904. In some embodiments, electrical control signals, such as microwave or RF frequency control signals, may be used to control the state (e.g., state change) of a given quantum memory. In some embodiments in which the quantum memories on quantum wafer 904 are nanophotonic cavities (e.g., single quantum memory 808), DC or low-frequency AC electric fields may be used to tune the color center resonances of such nanophotonic cavities. In some embodiments, such electrical control signals may also be configured such that cross talk and excess heating of the quantum memories on quantum wafer 904 may be avoided. In some embodiments, electrical control signals, such as DC, RF, and/or microwave signals, may be delivered to the quantum memories of quantum wafer 904 via micro-patterned electrical lines (e.g., coplanar waveguides, capacitors, etc. that may be made of semiconducting and/or superconducting materials) on both silicon base 902 and quantum wafer 904 (e.g., control signal leads 910). For example, such micro-patterned electrical lines may be patterned using photonic waveguide layer 804.

In some embodiments, quantum wafer 904 may also include other types of devices on the same wafer such that quantum wafer is a densely packaged device. For example, photon detectors, frequency conversion nonlinear optics (e.g., nonlinear optics elements 814), and/or light sources on chip may be fabricated. In some embodiments, electromagnets may be provided on quantum wafer 904 (e.g., small, "on-chip" electromagnets) in order to finetune a local magnetic field environment of the quantum memories. Such "on-chip" electromagnets may be patterned onto quantum wafer 904 via photolithography and/or electron beam lithography fabrication processes.

In some embodiments, quantum memories on quantum wafer 904 may resemble single quantum memory 808 and functionalities and/or the various types of quantum memory described above with regard to single quantum memory 808. Quantum wafer 904 may comprise a "host material" for quantum memories (photonic waveguide layer 802), and may be micro-patterned for electrical lines that allow electrical control signals to reach the quantum memories, according to some embodiments. The materials chosen for quantum wafer 904 may vary based on the type of quantum memory it hosts. For example, quantum wafer 904 may resemble a nanophotonic crystal interface for a type of quantum memory such as a diamond SiV color center. However, quantum wafer 904 may resemble any nanophotonic cavity (e.g., nanophotonic crystal cavities, ring resonators, plasmonic cavities, etc.) or Fabry Perot cavity that provides an optical interface for quantum memories of quantum memory device 900, when used to house other types of quantum memories. The nanophotonic cavities may be attached to a variety of substrates, such as diamond, LiNbO, or silicon, as described herein.

Once the type of nanophotonic cavity is chosen, quantum memory control devices of interface layer 906 may be used to match the frequency of the nanophotonic cavity to the given quantum emitter (e.g., an entangled particle source). For example, the quantum memory control devices may be used to perform optical tuning (e.g., refractive index shift), electromechanical deformation tuning, and/or gas (e.g., $N_2$ gas) deposition tuning onto the nanophotonic cavities. In addition, control signal leads 910 may provide electrical control signals to, and/or from, the quantum memories and may be attached to quantum wafer 904 via wire bonds 908. In some embodiments, control signal leads 910 may be routed to respective nonlinear optics elements 814 via electrical routing paths such as electrical routing path 820 (e.g., electrical connections that have been patterned onto photonic wafer 800, such as gold pads).

Figure 10:
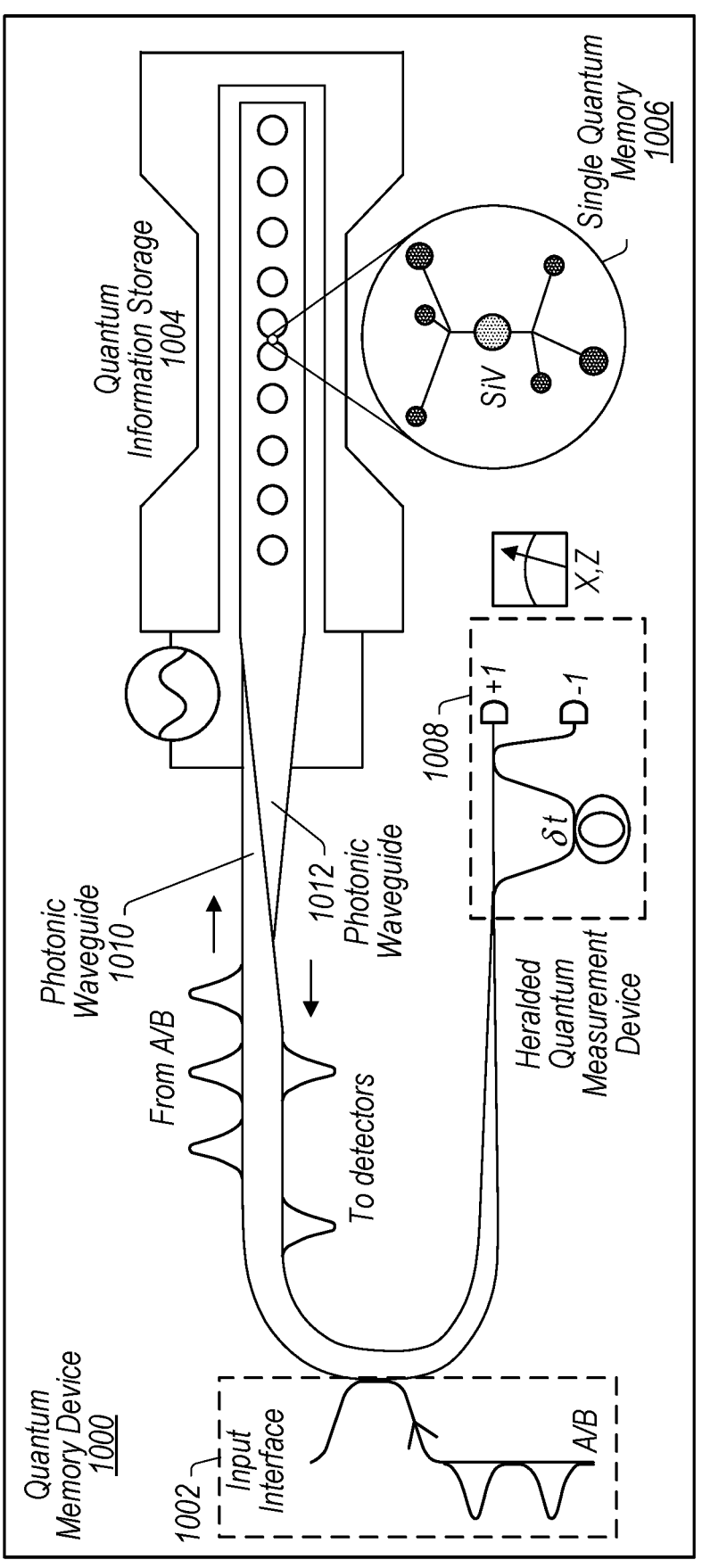
FIG. 10 illustrates an example of a quantum memory device, wherein quantum information storage device(s) of the quantum memory device may be provided photons through adiabatically coupled optical elements secured using a securing structure formed using photo-activated lithography, according to some embodiments.

FIG. 10 illustrates an example of a quantum memory device, wherein quantum information storage device(s) of the quantum memory device may be provided photons through adiabatically coupled optical elements secured using a securing structure formed using photo-activated lithography, according to some embodiments.

Quantum memory device 1000 includes in input interface 1002 that receives particles in a superposition state to quantum information storage 1004, which comprises single quantum memory 1006, and may be configured to couple to heralded quantum measurement device 1008 via photonic waveguide layer 1012. For example, single quantum memory 1006 illustrates a silicon vacancy in diamond structure. Though in some embodiments, other structures such as: nitrogen-vacancy in diamond, trapped atoms, ensemble doped crystals, atomic vapors, silicon carbide emitters, single rare earth dopants, trapped ions, superconducting qubits, quantum dots in gallium arsenide, etc. may be used. Furthermore, input interface 1002 illustrates an embodiment of a time-bin qubit encoding conversion module, however other embodiments with other input interface configurations may be used, including wavelength or mode matching.

In some embodiments, input interface 1002 may be configured to couple with photonic waveguide layer 1010, for example using an adiabatic coupling of tapered ends and securing structures as shown in FIG. 1 For example, input interface 1002 may receive an optical fiber 104 and adiabatically couple the optical fiber 104 to an optical element 102 of photonic waveguide 1012. This may be done using an adhesive 110 and securing structure 114 as shown in FIG. 1.

In some embodiments, quantum memory device 1000 may be configured to store quantum information corresponding to a first received entangled particle of a first pair of entangled particles in a first single quantum memory 1006 of quantum information storage 1004 and also store quantum information corresponding to a second received entangled particle of a second pair of entangled particles in a second single quantum memory 1006 of quantum information storage 1004. Quantum memory device 1000 may further be configured to perform one or more joint measurements on the first and second particles via heralded quantum measurement device 1008 without collapsing superposition states of the first and second entangled particles. The joint measurements may determine a correlation relationship between the superposition states of the entangled particles such that entanglement can be extended between the pairs of entangle particles.

Quantum memory device 1000 may be heralded, meaning that when a particle arrives to quantum memory device 1000, the quantum measurement device 1008 (or other device coupled to quantum information storage 1004 of quantum memory device 1000) issues a heralding signal announcing the arrival of the particle. In some embodiments, such a heralding signal may be used to operate an optical switch to align the switch such that the quantum memory receives a next particle from an entangled particle source with which quantum entanglement is to be distributed. Furthermore, when the second particle arrives at quantum memory device 1000 from the entangled particle source, a second heralding signal may be issued. The second heralding signal may then cause joint measurements to be performed on the first and second particles stored in quantum memory device 1000. Furthermore, the joint measurements may extend the entanglement (see also description pertaining to FIG. 12 herein). In some embodiments, quantum measurement device 1008 may perform heralding measurements and joint measurements, or in some embodiments, different quantum measurement devices 1008 may be used to perform heralding measurements and joint measurements on received particle pairs. In some embodiments, the heralding function may be performed by a quantum non-destruction measuring device that can detect a particle (e.g., photon) entering quantum memory device 1000 without causing the particle to be collapsed out of the superposition state.

In some embodiments, quantum memory device 1000 may further include a conversion interface. For example, in some embodiments, the conversion interface may convert a transmission frequency of a received particle to a different frequency. For example, in some embodiments, fiber optic links may transmit particles using different frequency wavelengths and such variations may be adjusted via a conversion interface of quantum memory device 1000. In some embodiments, the conversion interface may be located proximate to quantum memory device 1000, but may not necessarily be included in quantum memory device 1000.

In some embodiments, quantum memory device 1000 (or sets of quantum memories) may store redundant sets of particles for use in generating quantum entanglement that is to be distributed. In such embodiments, the quantum memor(ies) may perform error correction by comparing joint measurement results for multiple sets of particles. Such error correction may function as entanglement purification, in some embodiments. Also, parties at the endpoints connected via the redundantly distributed quantum entanglement may perform error correction.

Figure 11B:
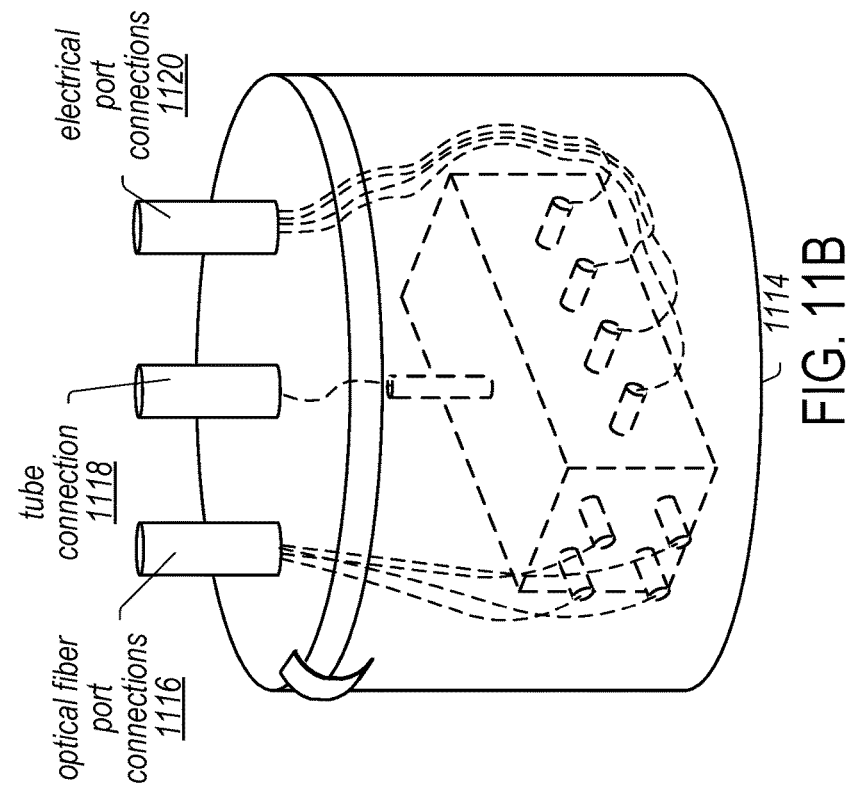
FIGS. 11A-11B illustrate installation of an optical device, such as a quantum memory device, comprising adiabatically coupled optical elements secured using a securing structure formed using photo-activated lithography, wherein the optical device is being installed into a cryogenic cooling device, according to some embodiments.
Figure 11A:
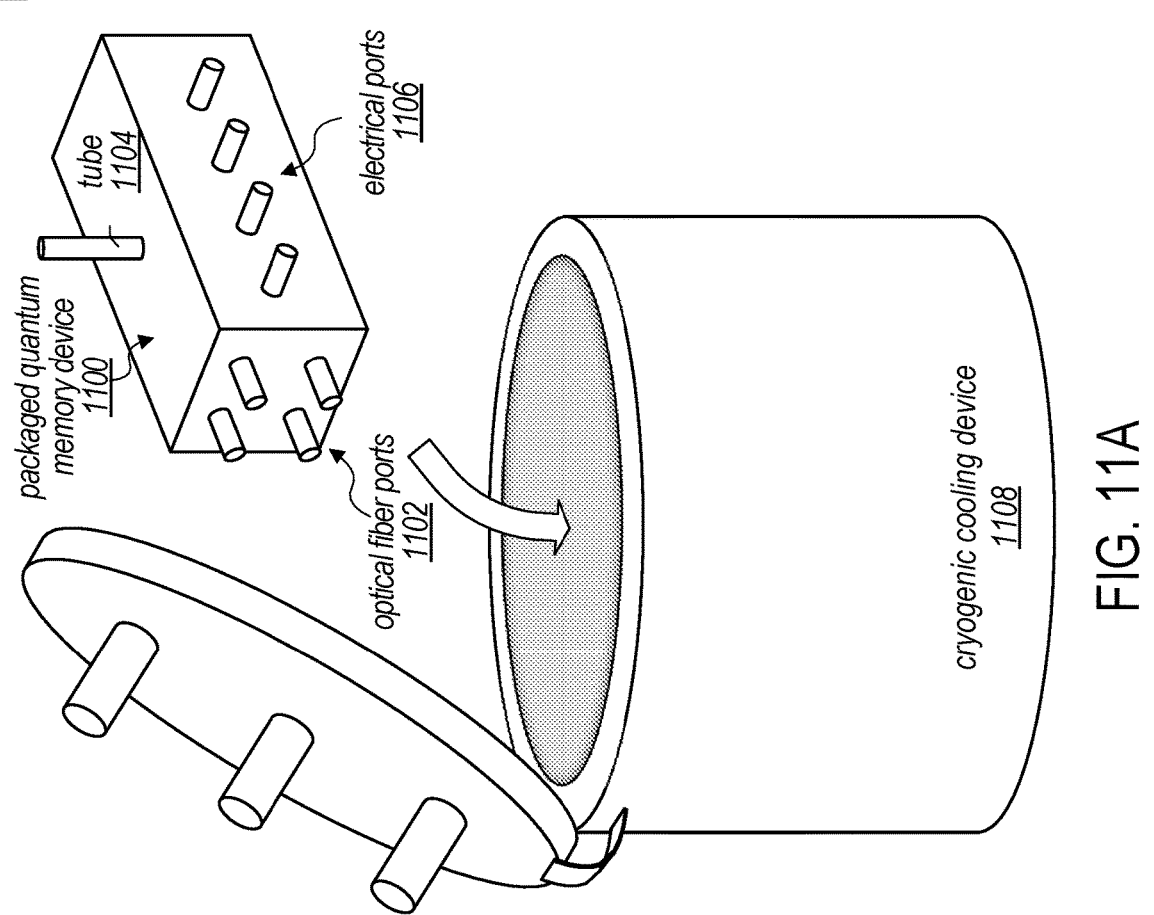

FIGS. 11A-11B illustrate installation of an optical device, such as a quantum memory device, comprising adiabatically coupled optical elements secured using a securing structure formed using photo-activated lithography, wherein the optical device is being installed into a cryogenic cooling device, according to some embodiments.

In some embodiments, one or more optical devices, such as packaged quantum memory device 1100, may be installed in a cryogenic cooling device, such as cryogenic cooling device 1108. Cryogenic cooling device 1108 may resemble a dilution refrigerator, cryogenic refrigerator, cryogenic cooling element, cryogenic cooler, and/or any system that may cool down to and maintain cryogenic temperatures over a period of time, according to some embodiments. It should be understood by someone having ordinary skill in the art that cryogenic cooling device 1108 is configured to operate at different temperatures and/or within different temperature ranges, such as within cryogenic temperature ranges and within higher temperature ranges (e.g., approximately room temperature, above room temperature, etc.), and is additionally able to stabilize at any given temperature within a given temperature range. As shown by reference numeral 1114 in FIG. 11B, packaged quantum memory device 1100 may be completely enclosed within cryogenic cooling device 1108 as part of an installation process at a destination location (e.g., wherein the destination location may be a location of a quantum network node for a quantum entanglement distribution service).

In some embodiments, installation of packaged quantum memory device 1100 into cryogenic cooling device 1108 may include coupling optical fiber connectors 1116 and electrical connectors 1120 to respective optical fiber and electrical ports of packaged quantum memory device 1100, such as optical fiber ports 1102 and electrical ports 1106. Installation of packaged quantum memory device 1100 into cryogenic cooling device 1108 may additionally include routing a gas tube, such as gas tube 1104, to and/or through a gas tube connection 1118, according to some embodiments.

In some embodiments, the additional securing structure 114 (as shown in FIG. 1) over the aligned tapered ends (106 and 108) of the first and second optical elements (102 and 104) is configured to experience temperature cycles from room temperatures to cryogenic temperatures while maintaining the alignment of the tapered ends of the first and second optical elements. Also, the additional securing structure 114 (as shown in FIG. 1) over the aligned tapered ends (106 and 108) of the first and second optical elements (102 and 104) is configured to experience mechanical shocks due to dropping or vibrations during transit of an optical device comprising the aligned and secured first and second optical elements.

Figure 12:
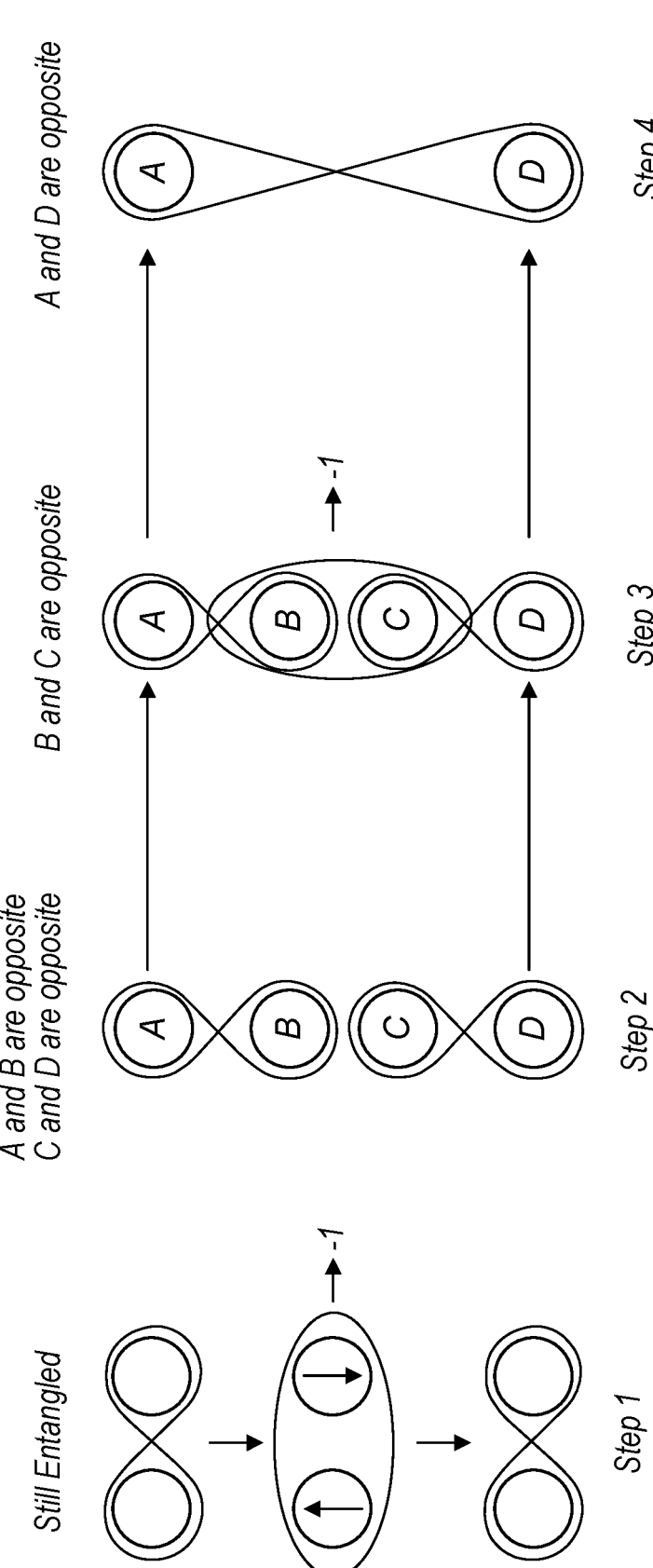
FIG. 12 is an example diagram illustrating how entanglement is extended by performing joint measurements of received particles of respective sets of entangled particles distributed via fiber optic network links, such as to/from quantum memory devices, according to some embodiments.

FIG. 12 is an example diagram illustrating how entanglement is extended by performing joint measurements of received particles of respective sets of entangled particles distributed via fiber optic network links, such as to/from quantum memory devices, according to some embodiments.

In some embodiments, joint measurements as shown in FIG. 12 may be performed for photons stored in quantum memories (e.g., single quantum memory 1006) in a quantum memory device, such as quantum memory device 1000. For example, at step 1, a joint measurement is performed that measures two particles (e.g., photons) in such a way as that the joint measurement only determines if the two particles are the same or opposite (e.g., in the same quantum state or not). This is done without revealing information about the individual particles. Then, at step 2, the entangled pairs are defined by their correlations, e.g., opposite or the same. In the example shown in FIG. 12, both A/B and C/D are entangled such that they are opposites. Next, at step 3 a joint measurement is performed on B/C with an outcome (e.g., opposite or same), which is opposite in the example case shown in FIG. 12. This tells A that its compliment is the opposite D's compliment, allowing A and D to infer they are opposites. Then, using this information at step 4 A/D the particles are now entangled such that they are always in the opposite state. In some embodiments, the joint measurements may be performed using a local two-qubit gate between B and C (e.g., a CNOT gate) and may further include measuring each bit individually. This can be understood as an entangling operation and a measurement, or conversely as a single measurement in an "entangled basis." When the joint measurements are performed in this way, the results reveal information about the correlations between particles, such as particles B and C, but not information about the particles themselves. This is due to the entanglement generated by the two-qubit operation. Such joint measurements may be performed at a quantum measurement device, according to some embodiments.

FIG. 13 illustrates an example implementation of an optical device, such as in a satellite communication system, which may include adiabatically coupled optical elements secured using a securing structure formed using photo-activated lithography, according to some embodiments.

While the examples described in FIGS. 8-12 were related to quantum entanglement distribution, quantum memories, quantum repeaters, etc., in some embodiments, securing structures, such as adhesive 110 and structure 114 formed used photo-activated lithography, as described herein, may be used in more general applications, such as securing optical elements in optical communications networks.

As an example, FIG. 13 illustrates satellite 1300 that includes a communications board 1308 coupled to an optical transmitter 1304 and/or an optical receiver 1306. Optical element 104 of optical transmitter 1304 and optical element 104 of optical receiver 1306 may be adiabatically coupled with respective optical elements 102 of communication board 1308. The adiabatically coupled optical elements are secured using respective adhesives 110 and additional securing structures formed using photo-activated lithography 114, such as described in FIG. 1 and throughout the detailed description.

The securing structures 110 and 114 may secure the adiabatic couplings between the optical elements despite vibrations and/or temperature changes. For example, satellite 1300 may be launched into space via rocket 1302, and the securing structures 110 and 114 may secure the adiabatic couplings between the optical elements of the communication board 1308 and the optical transmitter 1304 and optical receiver 1306 during the launch process and thereafter.

Processes and Systems for Aligning Optical Elements

In some embodiments, an optical element alignment device may be used to align tapered ends of optical elements in order to form adiabatic couplings. For example, aligning the optical elements to be secured as described above, may be performed using an optical element alignment device and procedure as described herein. In some embodiments, an optical element alignment device may include electrically-controllable mounts comprising piezoelectric or electrostatic materials that allow individual optical elements to be adjusted (e.g., vertically or horizontally) a very small distance, such as in increments of 1 to 5 microns (micrometers). Once the optical fibers are positioned sufficiently close to one another, van der waals attraction forces may keep the tapered ends together while a further securing process is performed, as described above with regard to FIG. 1.

A challenge in aligning optical elements is that the adiabatic fiber-device interface initially requires exceptionally fine alignment of the fiber to the device. This alignment is on the 100s of nanometer scale, which is much too fine to be achievable using even the very best classical machining or self-alignment techniques. Moreover, the fiber tapers themselves are quite delicate, and cannot be driven into the substrate with a large amount of force without breaking. As such, as an optical element alignment device and method, as described herein, is needed for individually actuating each fiber in an array of fibers such that it can gently be brought into contact with the target optical device. Once good contact has been made the fiber naturally remains held in place by Van Der Waals forces, which naturally tend to hold materials together. If the contact or coupling is poor the optical element alignment device can be used to separate the fiber from the device and contact can be attempted again. Eventually a good contact is made and the fiber remains stuck. In some embodiments, an optical element alignment device uses a piezoelectric material which expands or shrinks when a voltage is applied. By surrounding each fiber with a piezoelectric drive, a fiber can be pushed or pulled in small distances in a 2D plane.

Figure 14A:
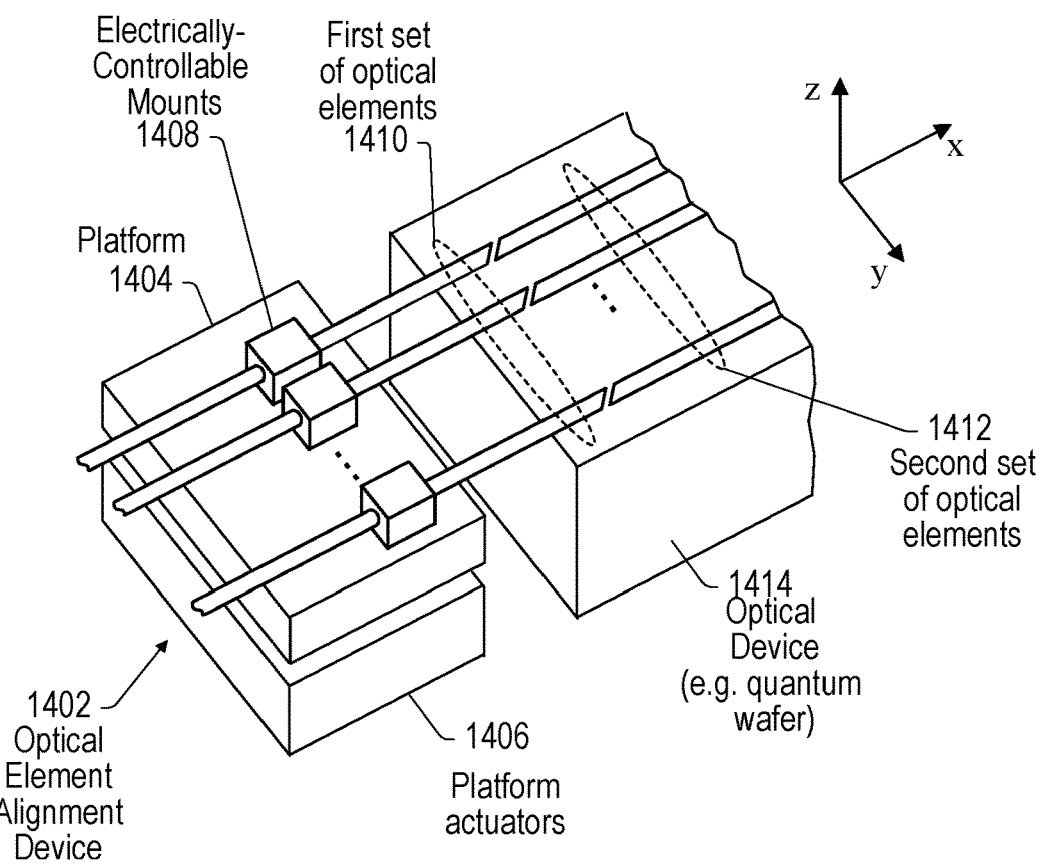
FIG. 14A illustrates a perspective view of a block diagram of an optical element alignment device comprising a movable platform and individual electrically-controllable optical element mounts included on the movable platform, according to some embodiments.

FIG. 14A illustrates a perspective view of a block diagram of an optical element alignment device comprising a movable platform and individual electrically-controllable optical element mounts included on the movable platform, according to some embodiments.

In some embodiments, an optical element alignment device, such as optical element alignment device 1402, includes a platform 1404 and platform actuators 1406. The platform actuators 1406 are configured to perform platform manipulations 1440, which may include translations in 3D dimensions, such as X, Y, and Z, as well as rotations to adjust pitch, roll, and yaw, such as rotations about the X-axis, Y-axis, and Z-axis. Additionally, platform 1404 includes a plurality of individually controllable mounts, such as electrically-controllable mounts 1408. A first set of optical elements 1410 are loaded into the electrically-controllable mounts 1408 and are adjusted for coupling with a second set of optical elements 1412, such as of optical device 1414 (which as an example may be a photonic wafer 800 and/or a quantum wafer 904, as a few examples).

Figure 14B:
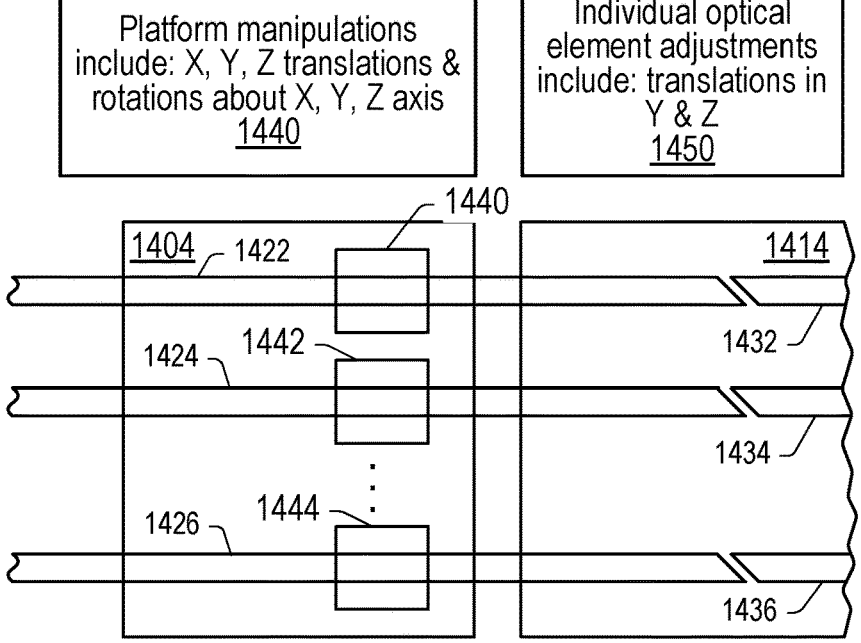
FIG. 14B illustrates a top view of a block diagram of an optical element alignment device comprising a movable platform and individual electrically-controllable optical element mounts included on the movable platform, according to some embodiments.

FIG. 14B illustrates a top view of a block diagram of an optical element alignment device comprising a movable platform and individual electrically-controllable optical element mounts included on the movable platform, according to some embodiments.

In some embodiments, each of the electrically-controllable mounts 1408 is individually controllable to perform individual optical element adjustments 1450, such as vertical or horizontal adjustments, e.g., adjustments in the Y and Z direction (where X represents a depth direction along the axis of the optical elements). In a first stage, platform actuators 1406 may adjust platform 1404 such that the tapered ends of the first set of optical elements 1410 are adjacent to, or touching, tapered ends of the second set of optical elements 1412. In some embodiments, the X-direction depth adjustments may be performed using platform actuators 1406. In a second stage, once the platform has been adjusted such that the first set of optical elements 1410 and the second set of optical elements 1412 are touching, or adjacent to one another, individual adjustments for each of the optical elements may be performed by the electrically-controllable mounts 1408 to improve the alignment of each individual pair of optical elements being coupled together. In some embodiments, the optical elements may be made of thinly tapered diamond, lithium niobate, aluminum nitride, silicon, silicon nitride, or may be other types of fiber optic cables, etc. In some embodiments, hydrofluoric acid or ion beam milling may be used to form a tapered end on the optical elements, such as tapered ends 106 and 108 shown in FIG. 1 for optical elements 102 and 104.

For example, electrically-controllable mount 1440 may adjust optical element 1422 to align with optical element 1432, while electrically-controllable mount 1442 may independently adjust optical element 1424 to align with optical element 1434 and electrically-controllable mount 1444 may independently adjust optical element 1426 to align with optical element 1436. In some embodiments, electrically-controllable mounts 1440, 1442, and 1444 may make adjustments at the same time but may adjust each individual optical element (e.g., optical elements 1422, 1424, and 1426, respectively) in different directions during a single adjustment cycle. In some embodiments, individual optical element adjustments may have a precision granularity that is an order of magnitude smaller than a most fine adjustment increment achievable via platform actuators 1406. For example, adjustment precision of electrically-controllable mounts 1408 may be on the order of 500 nanometers or less, and, in some embodiments, adjustment precision may be as precise as 100 nanometers or less.

FIG. 15 is a flow diagram illustrating steps of a process for aligning tapered ends of a first set of optical elements with tapered ends of a second set of optical elements using an optical element alignment device comprising a movable platform and individual electrically-controllable optical element mounts included on the movable platform, according to some embodiments.

At block 1502, respective ones of a first set of optical elements, such as optical elements 1422, 1424, and 1426 of first set of optical elements 1410, are attached to respective electrically-controllable mounts, such as electrically-controllable mounts 1440, 1442, and 1444. In some embodiments, the first set of optical elements may be fiber optic cables. The electrically-controllable mounts are part of a moveable platform, such as movable platform 1404 controlled by platform actuators 1406. The moveable platform is configured to move in three-dimensional (3D) space to align the first set of optical elements with a second set of optical elements, such as optical elements 1432, 1434, and 1436 of second set of optical elements 1412. The electrically-controllable mounts are configured to perform individual adjustment, such as individual adjustments 1450, to finetune alignments of individual optical element pairs of the first and second sets of optical elements.

At block 1504, the movable platform is manipulated such that tapered ends of the optical elements of the first set are positioned adjacent to, or touching, tapered ends of the optical elements of the second set, wherein the first set of optical elements are to be coupled to the second set of optical elements.

At block 1506, once the platform has been adjusted sufficiently to position the tapered ends of the optical elements of the first set adjacent to, or touching, tapered ends of the optical elements of the second set, the movable platform may be locked into place or otherwise held static while individual adjustments are made using the electrically-controllable mounts 1408.

Figure 20:
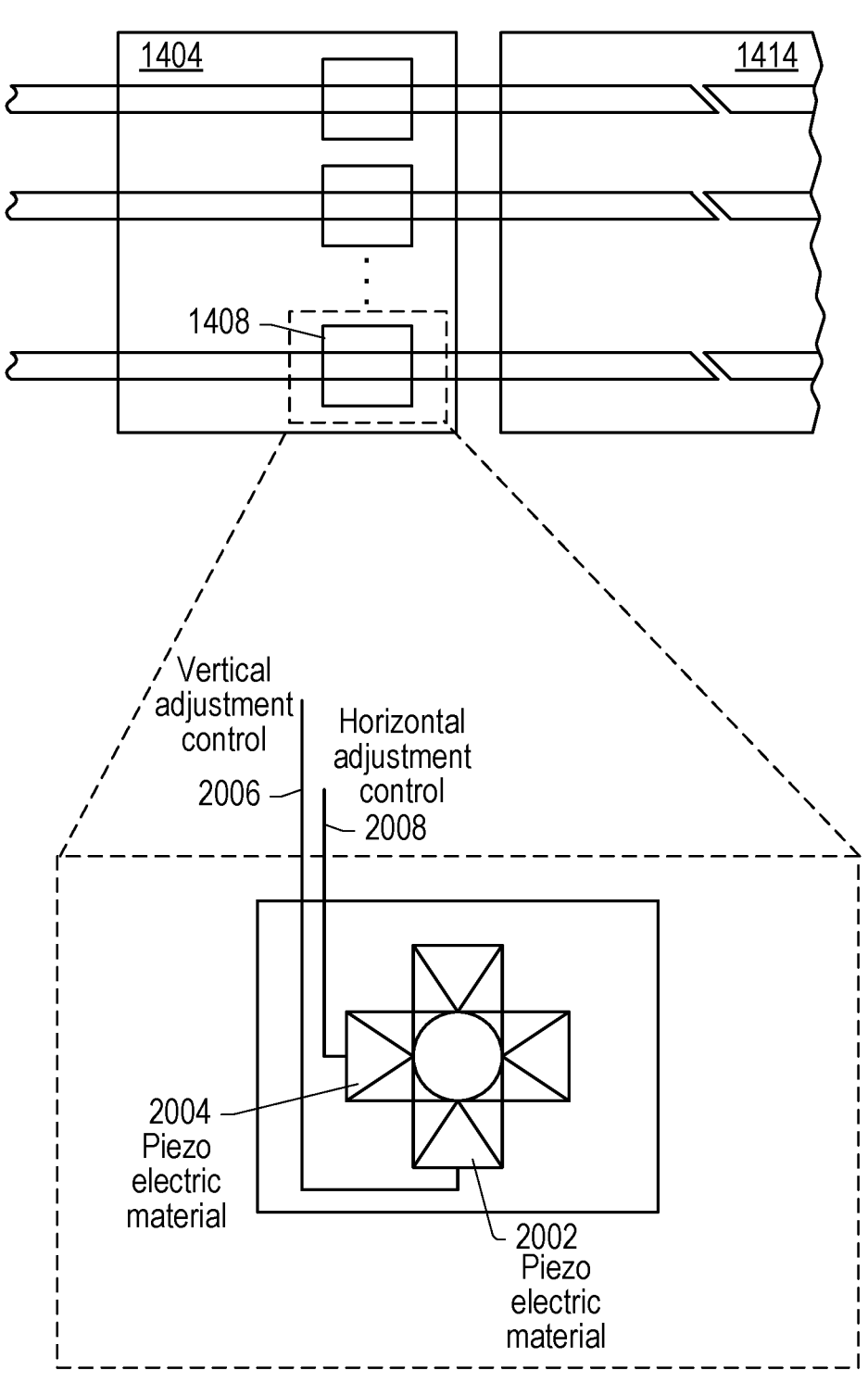
FIG. 20 is a block-diagram illustrating components of an electrically-controllable optical element mount comprising piezo electric materials configured to individually adjust a position of a single optical element in at least two directions, according to some embodiments.
Figure 21:
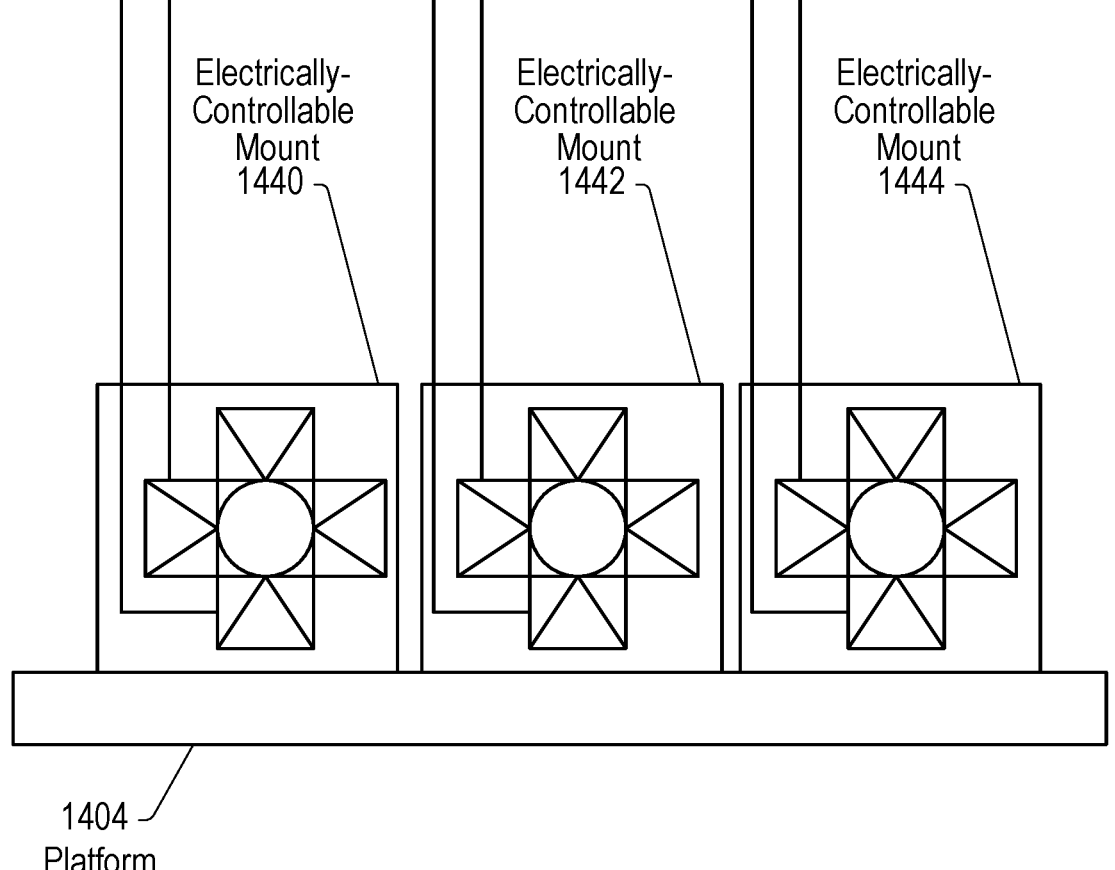
FIG. 21 is a block-diagram illustrating a sectional view of a movable platform of an optical element alignment device that comprises multiple electrically-controllable optical element mounts mounted on the movable platform, according to some embodiments.

At block 1508, positions of individual ones of the optical elements of the first set, such as individual ones of optical elements 1422, 1424, and 1426, are adjusted in position vertically and/or horizontally to better align with a corresponding one of the optical elements of the second set. This is performed using the electrically-controllable mounts 1440, 1442, and 1444. For example, as shown in FIGS. 20 and 21, at different moments in time individual adjustments may be performed concurrently for different optical elements, and the individual adjustments may adjust different ones of the optical elements differently at the same time or in subsequent moments in time.

Figures 16A, 16B:
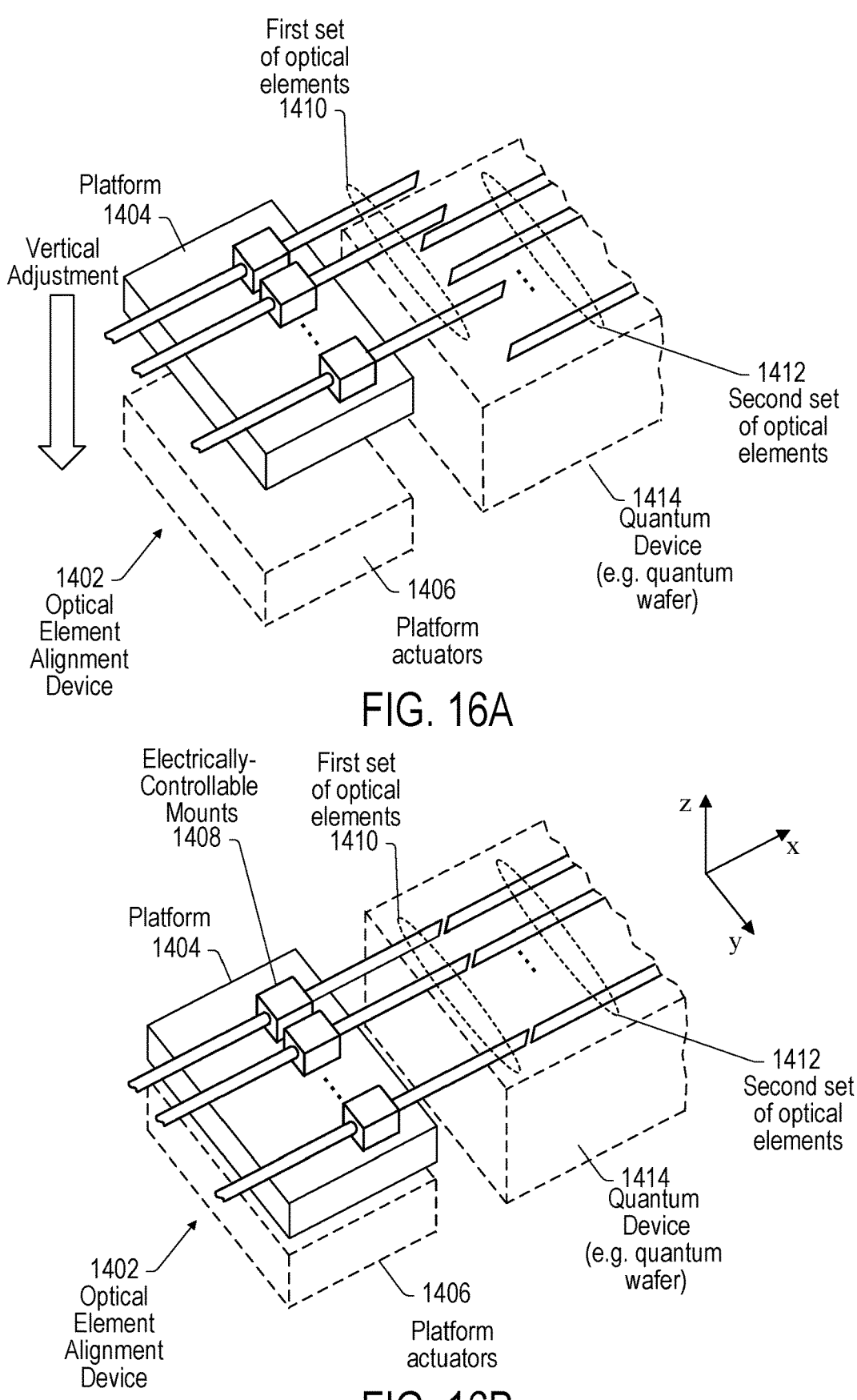
FIGS. 16A-16B illustrate a movable platform of an optical element alignment device being adjusted vertically to align tapered ends of a first set of optical elements with tapered ends of a second set of optical elements, according to some embodiments.

FIGS. 16A-16B illustrate a movable platform of an optical element alignment device being adjusted vertically to align tapered ends of a first set of optical elements with tapered ends of a second set of optical elements, according to some embodiments.

As can be seen in FIGS. 16A and 16B, platform actuators 1406 may vertically adjust (e.g., in a Z-direction) platform 1404 to align the tapered ends of the first set of optical elements 1410 with the tapered ends of the second set of optical elements 1412.

FIGS. 17A-17B illustrate a movable platform of an optical element alignment device being adjusted horizontally to align tapered ends of a first set of optical elements with tapered ends of a second set of optical elements, according to some embodiments.

As can be seen in FIGS. 17A and 17B, platform actuators 1406 may horizontally adjust (e.g., in a Y-direction) platform 1404 to align the tapered ends of the first set of optical elements 1410 with the tapered ends of the second set of optical elements 1412.

Figure 18A:
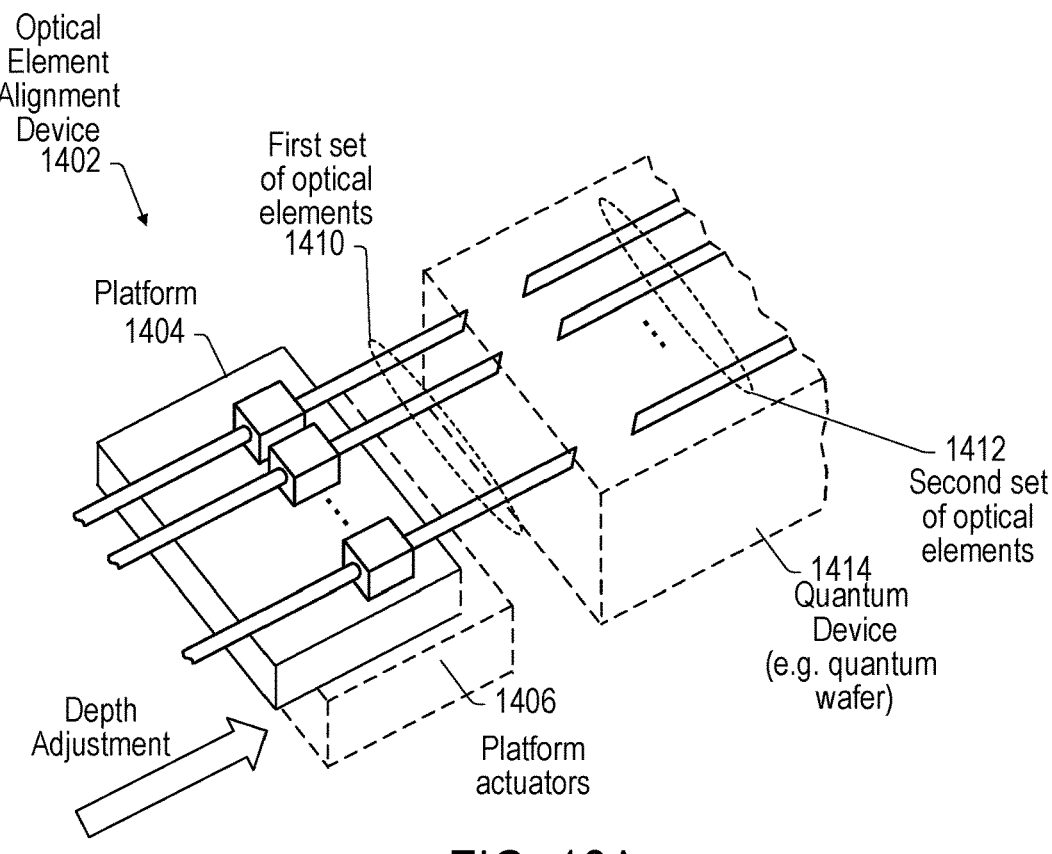
FIGS. 18A-18B illustrate a movable platform of an optical element alignment device being adjusted in a depth direction to align tapered ends of a first set of optical elements with tapered ends of a second set of optical elements, according to some embodiments.
Figure 18B:
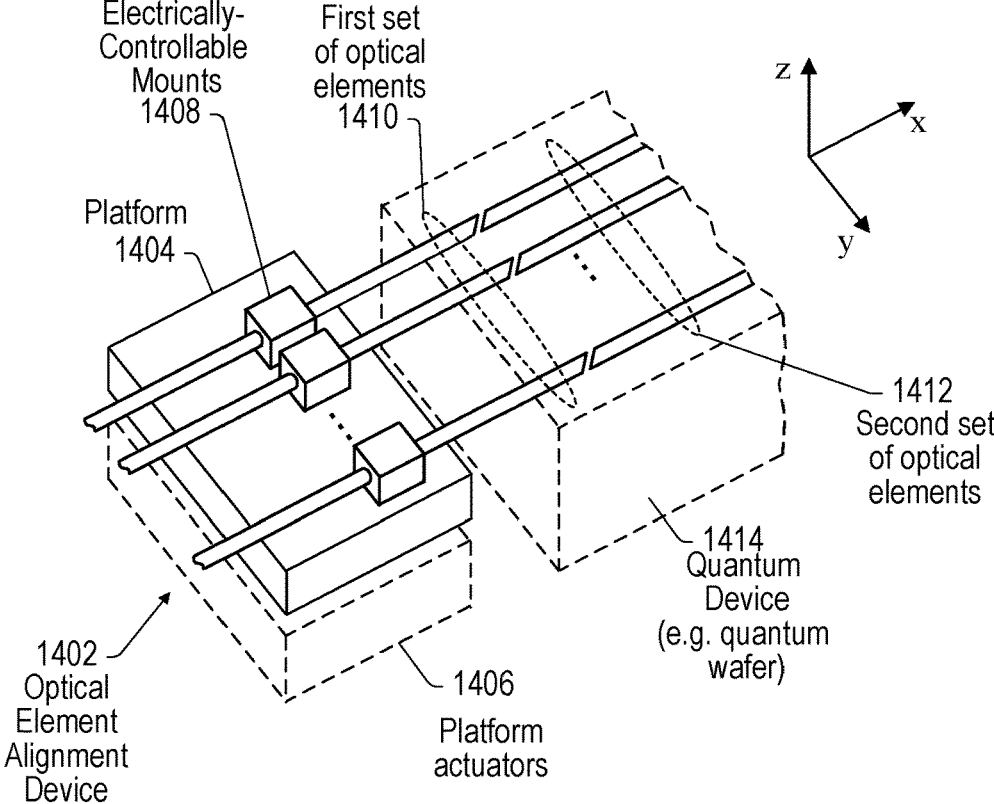

FIGS. 18A-18B illustrate a movable platform of an optical element alignment device being adjusted in a depth direction to align tapered ends of a first set of optical elements with tapered ends of a second set of optical elements, according to some embodiments.

As can be seen in FIGS. 18A and 18B, platform actuators 1406 may adjust platform 1404 in a depth direction (e.g., X-direction) to align the tapered ends of the first set of optical elements 1410 with the tapered ends of the second set of optical elements 1412.

Figures 19A, 19B:
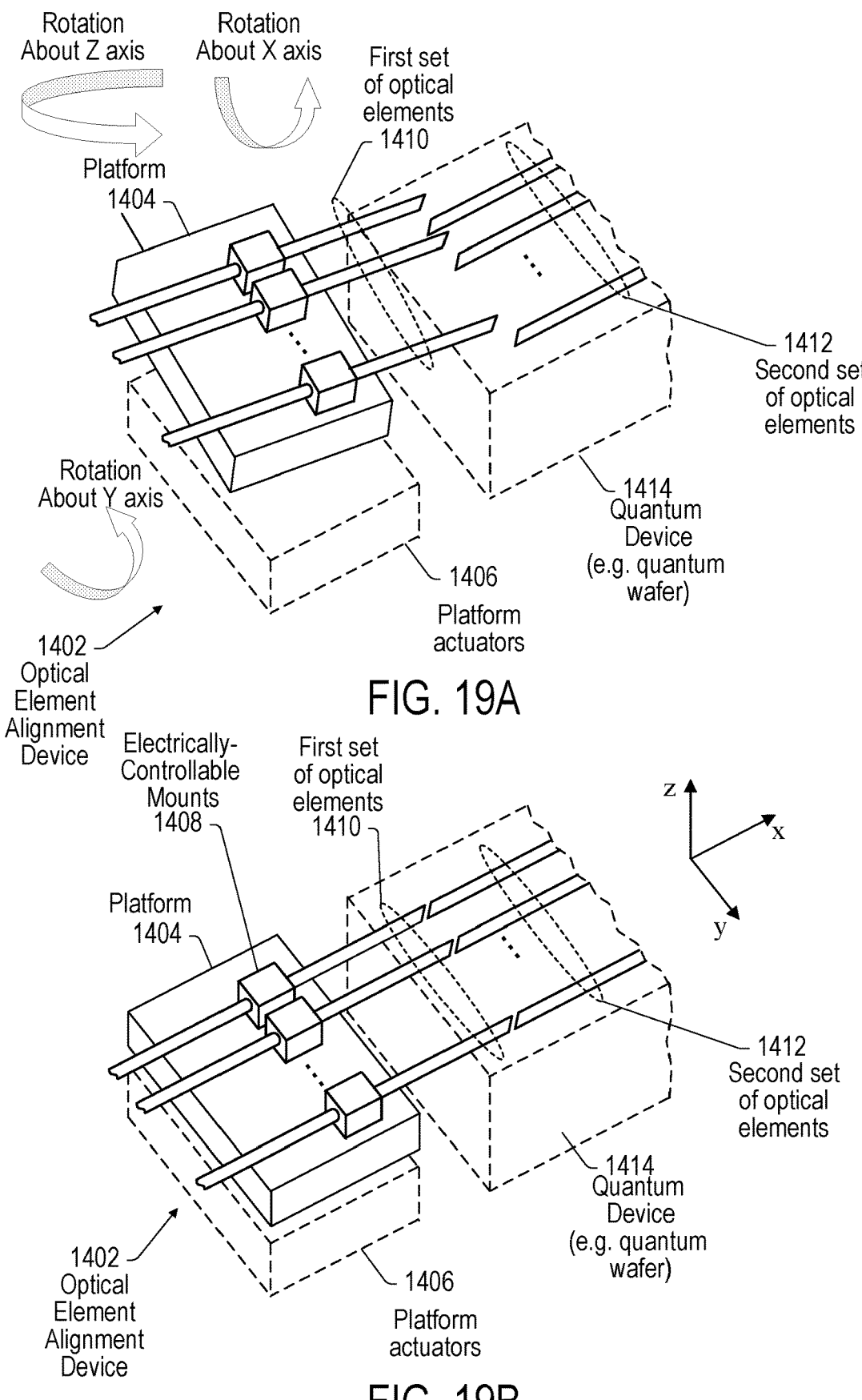
FIGS. 19A-19B illustrate a movable platform of an optical element alignment device being rotated to align tapered ends of a first set of optical elements with tapered ends of a second set of optical elements, according to some embodiments.

FIGS. 19A-19B illustrate a movable platform of an optical element alignment device being rotated to align tapered ends of a first set of optical elements with tapered ends of a second set of optical elements, according to some embodiments.

As can be seen in FIGS. 19A and 19B, platform actuators 1406 may adjust platform 1404 to rotate to adjust pitch, roll, and/or yaw of the platform 1404 (e.g., X-axis rotation, Y-axis rotation, and/or Z-axis rotation) to align the tapered ends of the first set of optical elements 1410 with the tapered ends of the second set of optical elements 1412.

FIG. 20 is a block-diagram illustrating components of an electrically-controllable optical element mount comprising piezo electric materials configured to individually adjust a position of a single optical element in at least two directions, according to some embodiments.

In some embodiments, electrically-controllable mounts 1408 include orthogonally arranged piezoelectric actuators 2002 and 2004 as shown in FIG. 20. Each piezoelectric actuator may have its own control line, such as vertical adjustment control 2006 and horizontal adjustment control 2008. As further described in FIGS. 25 and 26, a control computer of an optical alignment device (e.g., controller) may determine individual vertical and horizontal adjustments to be made for individual optical fibers and may control piezoelectric actuators 2002 and 2004 via vertical and horizontal control lines 2006 and 2008.

FIG. 21 is a block-diagram illustrating a sectional view of a movable platform of an optical element alignment device that comprises multiple electrically-controllable optical element mounts mounted on the movable platform, according to some embodiments.

As can be seen in FIG. 21, multiple electrically-controllable mounts 1440, 1442, and 1444 may be mounted to a common platform 1304. The electrically-controllable mounts 1440, 1442, and 1444 are individually controllable, such that different ones of the electrically-controllable mounts 1440, 1442, and 1444 can be controlled to make adjustments in different direction at the same time as other ones of the electrically-controllable mounts 1440, 1442, and 1444.

Figures 22, 23:
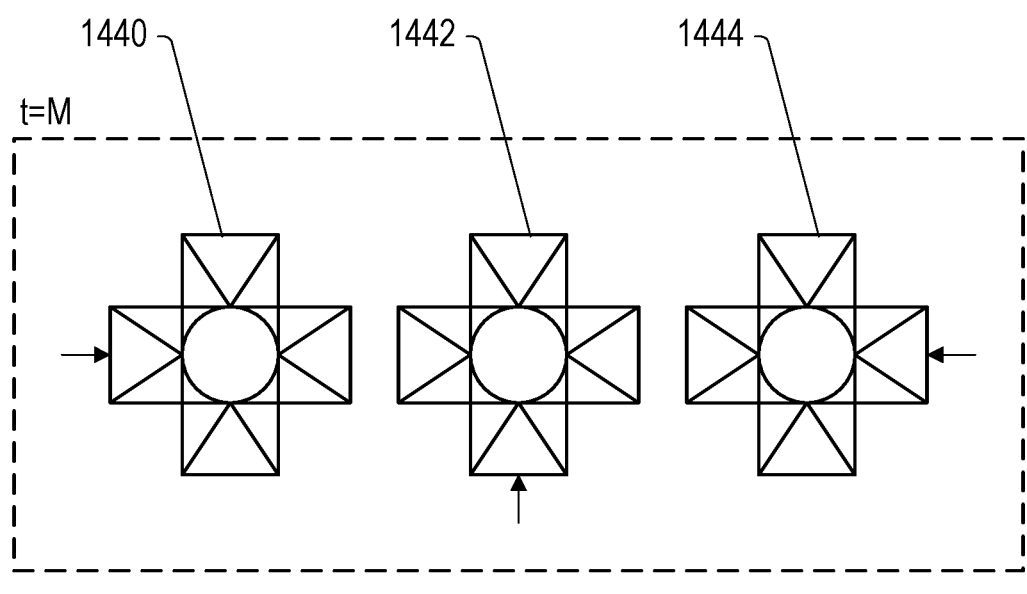
FIG. 22 illustrates a first set of different individual movements being applied, via different electrically-controllable optical element mounts mounted on the movable platform, at a first moment in time, according to some embodiments.
FIG. 23 illustrates another set of different individual movements being applied, via different electrically-controllable optical element mounts mounted on the movable platform, at a subsequent moment in time, according to some embodiments.

FIG. 22 illustrates a first set of different individual movements being applied, via different electrically-controllable optical element mounts mounted on the movable platform, at a first moment in time, according to some embodiments.

For example, in FIG. 22, at a given moment in time M electrically-controllable mount 1440 is adjusting a given optical element 104 to the right, while electrically-controllable mount 1442 is adjusting another given optical element 104 upwards, while electrically-controllable mount 1444 is adjusting yet another given optical element 104 to the left.

FIG. 23 illustrates another set of different individual movements being applied, via different electrically-controllable optical element mounts mounted on the movable platform, at a subsequent moment in time, according to some embodiments.

At a subsequent moment in time, as shown in FIG. 23, such as time M+N, electrically-controllable mount 1440 adjusts the given optical element 104 upwards, while electrically-controllable mount 1442 adjusts the other given optical element 104 upwards, while electrically-controllable mount 1444 adjust the yet another given optical element 104 to the right.

As can be seen, individual optical element adjustments may be performed in different directions at the same time via electrically-controllable mounts 1440, 1442, and 1444.

FIG. 24 is a flow diagram illustrating steps of a first stage of a process for aligning tapered ends of a first set of optical elements with tapered ends of a second set of optical elements using an optical element alignment device, according to some embodiments.

At block 2402, a moveable platform, such as movable platform 1404, is positioned such that optical elements mounted in electrically-controllable mounts of the movable platform are adjacent to a second set of optical elements.

At block 2404, a controller of an optical element alignment device causes one or more images to be captured of the alignment of the platform and first set of optical elements relative to the second set of optical elements. Then at block 2406, the controller of the optical element alignment device determines, using machine vision, one or more platform adjustments to improve alignment. In some embodiments, the controller may additionally determine, using the machine vision, a taper shape of the tapered ends of the first set of optical elements and a tapered shape of the tapered ends of the second set of optical elements; a taper location of the tapered ends of the first set of optical elements and a taper location of the tapered ends of the second set of optical elements; and/or a taper angle of the tapered ends of the first set of optical elements and a taper angle of the tapered ends of the second set of optical elements.

Then, at block 2408, the controller of the optical element alignment device causes one or more actuators, such as platform actuators 1406, to adjust the platform, vertically, horizontally, in a depth direction, and/or pitch, roll, or yaw of the platform. At block 2410, the controller of the optical element alignment device causes one or more images to be captured of the adjusted alignment of the platform and first set of optical elements relative to the second set of optical elements, and at block 2412, the controller of the optical element alignment device determines whether or not the platform adjustments are sufficient such that misalignment between the tapered ends of the first set of optical elements and the tapered ends of the second optical elements is less than a first threshold amount of misalignment. If not, additional adjustments are made until the threshold is satisfied. Once the threshold is satisfied, at block 2414, the controller of the optical element alignment device proceeds to a second stage of alignment as described in FIG. 25.

Figure 25:
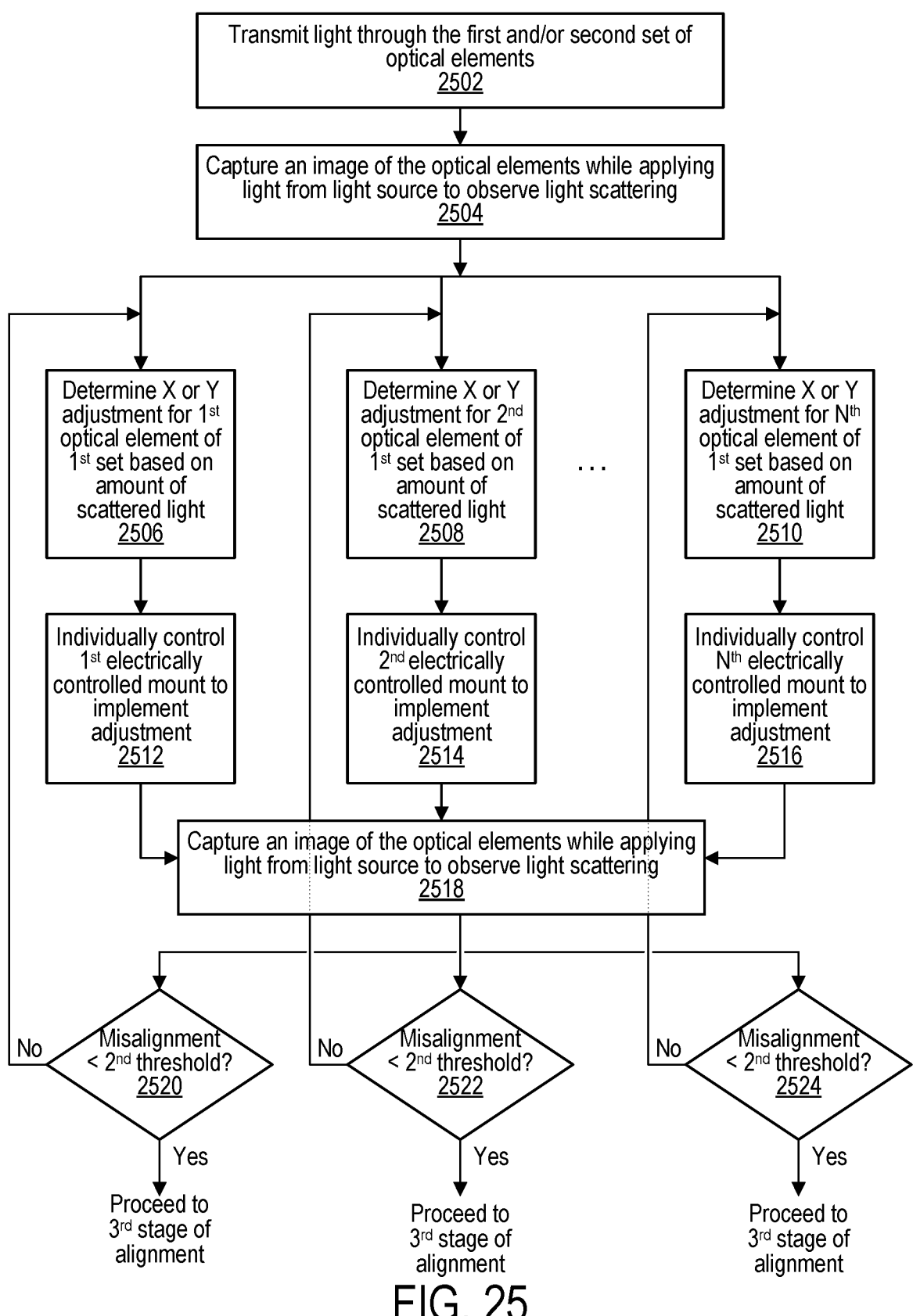
FIG. 25 is a flow diagram illustrating steps of a second stage of a process for aligning tapered ends of a first set of optical elements with tapered ends of a second set of optical elements using an optical element alignment device, according to some embodiments.

FIG. 25 is a flow diagram illustrating steps of a second stage of a process for aligning tapered ends of a first set of optical elements with tapered ends of a second set of optical elements using an optical element alignment device, according to some embodiments.

At block 2502, a controller of an optical element alignment device causes light to be transmitted through the first and/or second sets of optical elements being aligned. At block 2504, the controller of the optical element alignment device causes an image of the optical elements to be captured while the light is being transmitted through them. The captured image allows for observation of scattering of light at misaligned tapered ends. At blocks 2506, 2508, and 2510, individual adjustments to be performed by respective electrically-controllable mounts (such as electrically-controllable mounts 1440, 1442, and 1444) are determined based on the observed light scattering, and at blocks 2512, 2514, and 2516, the respective electrically-controllable mounts (such as electrically-controllable mounts 1440, 1442, and 1444) are controlled to implement the determined adjustments.

At block 2518, the controller of the optical element alignment device causes another image of the optical elements to be captured while the light is being transmitted through them to observe changes in the light scattering. Then at blocks 2520, 2522, and 2524, the controller determines whether each of the optical elements is aligned in a way that satisfies a second threshold based on the presence, or lack thereof, of scattered light at the interface between the tapered ends of the corresponding optical elements being aligned. If the second threshold is not met for one or more of the optical elements, the process reverts back to respective ones of blocks 2506, 2508, or 2510 and is repeated for that given optical element until the second threshold is met. Once the second threshold is met, the process proceeds to a third alignment stage. In some embodiments, alignment of some optical elements may proceed to the third stage while further light scattering based adjustments are being made for other optical elements as part of the second stage.

Figure 26:
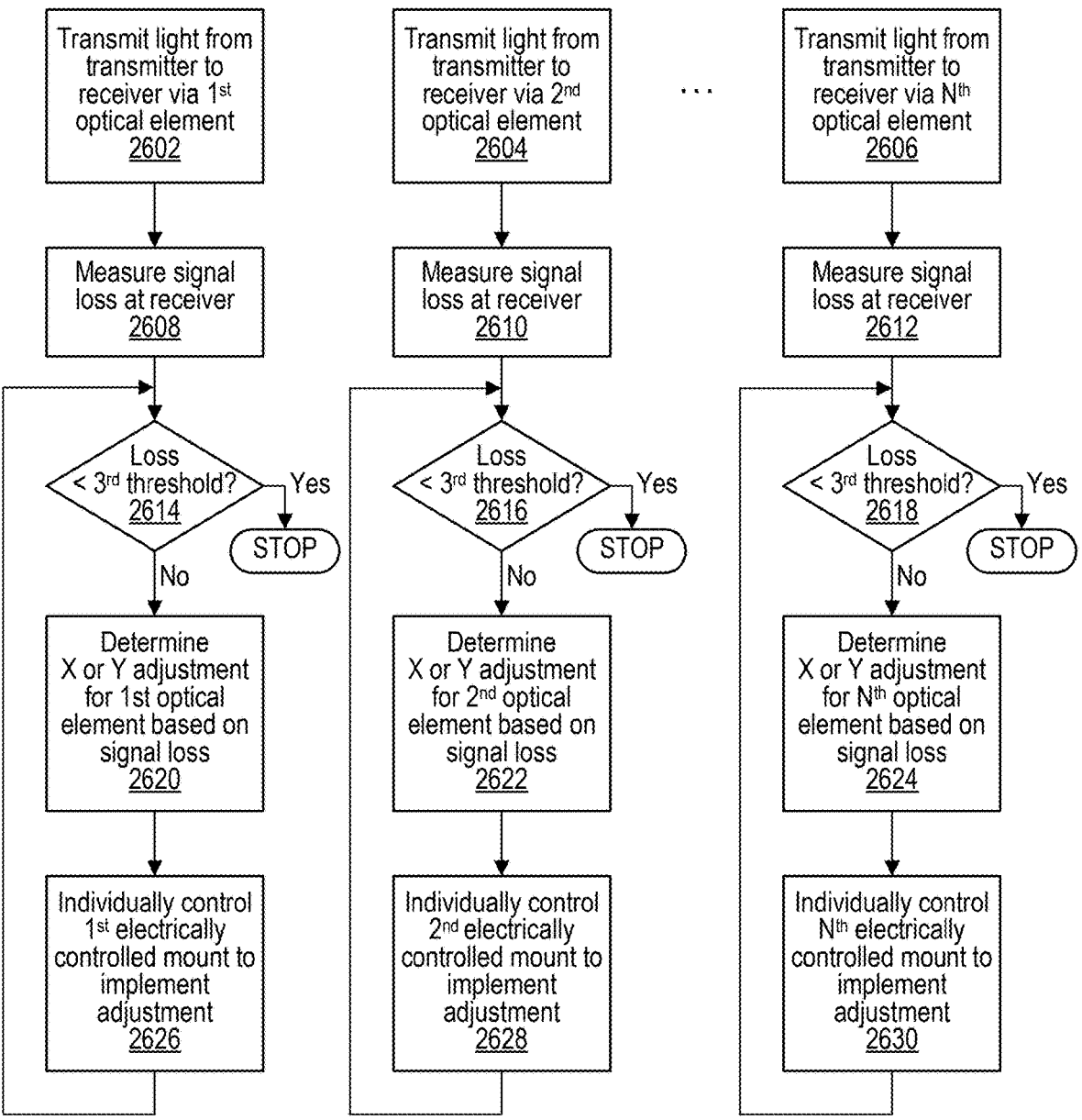
FIG. 26 is a flow diagram illustrating steps of a third stage of a process for aligning tapered ends of a first set of optical elements with tapered ends of a second set of optical elements using an optical element alignment device, according to some embodiments.

FIG. 26 is a flow diagram illustrating steps of a third stage of a process for aligning tapered ends of a first set of optical elements with tapered ends of a second set of optical elements using an optical element alignment device, according to some embodiments.

At blocks 2602, 2604, and 2606, light signals are routed through the optical elements that have been aligned in a way that satisfies the second threshold discussed in FIG. 25. And, at blocks 2608, 2610, and 2612, signal loss is measured for each optical element pair being aligned. At blocks 2614, 2616, and 2618, a controller of the optical element alignment device determines whether a third threshold is met based on the measured signal loss. If the third threshold is satisfied, then the process stops. If not, additional individual adjustments are determined at blocks 2620, 2622, and 2624, and are implemented at blocks 2626, 2628, and 2630. This process may repeat until the third threshold is satisfied. For example, in some embodiments, the third threshold may be a threshold amount of signal loss, such as 0.5 dB or less.

Embodiments of the present disclosure may be described in view of the following clauses:

Clause 1. A method of forming a secure coupling between optical elements, the method comprising:

aligning a tapered end of a first optical element with a tapered end of a second optical element, wherein the tapered ends of the first and second optical elements have complimentary taperings;

securing, a given one of the first or second optical elements to a structure of an optical device, wherein said securing is performed by applying an adhesive to the given first or second optical element to secure it to the structure of the optical device;

immersing the first and second optical elements that have been aligned and at least partially secured via the adhesive in a photo-active liquid polymer; and forming an additional securing structure over the aligned tapered ends of the first and second optical elements by applying photons of light to the photo-active liquid polymer to form the additional securing structure.

Clause 2. The method of clause 1, wherein the aligning of the tapered ends of the first and second optical elements forms an adiabatic coupling between the first and second optical elements.

Clause 3. The method of clause 1, wherein the first and second optical elements comprise:

a fiber optic cable; and a waveguide of an optical device.

Clause 4. The method of clause 3, further comprising:

performing said aligning, said immersing, and said forming the additional securing structure for a plurality of fiber optical cables that couple with respective ones of a plurality of waveguides of the optical device.

Clause 5. The method of clause 4, wherein said performing said aligning, said immersing, and said forming the additional securing structure are performed in parallel for at least a portion of the waveguides and corresponding optical fibers of the optical device.

Clause 6. The method of clause 1, wherein applying the photons of light to the photo-active liquid polymer to form the additional securing structure is performed using a two-photon lithography process.

Clause 7. The method of clause 1, wherein the additional securing structure over the aligned tapered ends of the first and second optical elements is configured to experience temperature cycles from room temperatures to cryogenic temperatures while maintaining the alignment of the tapered ends of the first and second optical elements.

Clause 8. The method of clause 1, wherein the additional securing structure over the aligned tapered ends of the first and second optical elements is configured to experience mechanical shocks due to dropping or vibrations during transit of an optical device comprising the aligned and secured first and second optical elements.

Clause 9. An optical coupling structure comprising:

adhesive placed to secure a first optical element to a structure of an optical device including a second optical element, wherein tapered ends the first optical element and the second optical element have been aligned; and an additional securing structure formed over the aligned tapered ends of the first and second optical elements, wherein the additional securing structure is formed by applying photons of light to a photo-active liquid polymer in which the aligned tapered ends of the first and second optical elements have been immersed.

Clause 10. The optical coupling structure of clause 9, wherein the second optical element is a waveguide of the optical device and the first optical element is a fiber optic cable coupled to the optical device.

Clause 11. The optical coupling structure of clause 9, wherein the tapered ends of the first and second optical elements form an adiabatic coupling between the first and second optical elements.

Clause 12. The optical coupling structure of clause 9, wherein the adhesive comprises an epoxy placed in a liquid form over a casing of the first optical element and the structure of the optical device, wherein the epoxy hardens to secure the first optical element in place with respect to the structure of the optical device.

Clause 13. The optical coupling structure of clause 9, wherein the additional securing structure has a length along respective axis of the first and second optical elements that extends for approximately 50 or less wavelengths in either direction from the aligned tapered ends of the first and second optical elements for a total length of approximately 100 or less wavelengths, wherein the wavelengths correspond to wavelengths of light transmitted via the coupled first and second optical elements.

Clause 14. The optical coupling structure of clause 9, wherein the additional securing structure has a radius orthogonal to respective axis of the first and second optical elements that extends for approximately 10 wavelengths or less in either direction from the aligned tapered ends of the first and second optical elements for a total diameter of approximately 20 wavelengths or less, wherein the wavelengths correspond to wavelengths of light transmitted via the coupled first and second optical elements.

Clause 15. The optical coupling structure of clause 9, wherein the additional securing structure has a varying radius that forms an inverse hour glass shape, wherein a thicker center portion of the inverse hour glass shape is aligned with the aligned tapered ends of the first and second optical elements, and wherein the thickness of the additional securing structure tapers down in either direction from the thicker center portion.

Clause 16. The optical coupling structure of clause 9, wherein the additional securing structure has a cylindrical shape centered on the aligned tapered ends of the first and second optical elements.

Clause 17. The optical coupling structure of clause 9, further comprising:

a plurality of additional pieces of adhesive placed to secure a plurality of additional optical elements to the structure of the optical device, wherein the optical device includes a plurality of other optical elements that couple with the additional optical elements, and wherein tapered ends of the additional optical elements and tapered ends of the other optical elements have been aligned; and a plurality of additional securing structures formed over the aligned tapered ends of the additional optical elements and the other optical elements, wherein the plurality of additional securing structures are formed by applying photons of light to a photo-active liquid polymer in which the aligned tapered ends of the additional optical elements and the tapered ends of the other optical elements have been immersed.

Clause 18. A photonic device, comprising:

a first optical element;

a second optical element;

adhesive placed to secure the first optical element to a structure of an optical device included in the photonic device, wherein tapered ends the first optical element and the second optical element have been aligned; and an additional securing structure formed over the aligned tapered ends of the first and second optical elements, wherein the additional securing structure is formed by applying photons of light to a photo-active liquid polymer in which the aligned tapered ends of the first and second optical elements have been immersed.

Clause 19. The photonic device of clause 18, wherein the photonic device is, or comprises, a quantum repeater.

Clause 20. The photonic device of clause 18, wherein the photonic device is, or comprises, a quantum memory.

Illustrative Computer System

Figure 27:
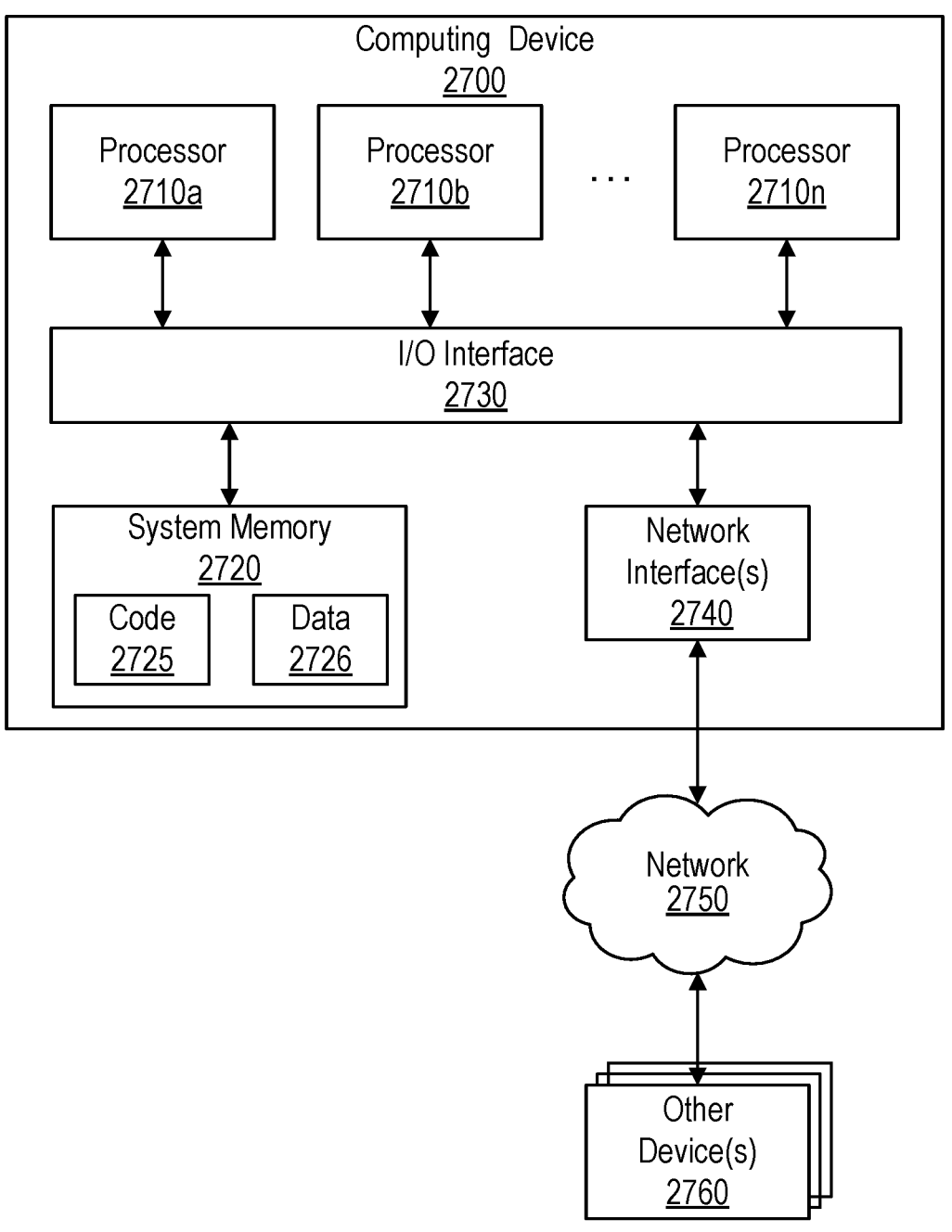
FIG. 27 is a block diagram illustrating an example computing device that may be used in at least some embodiments.

FIG. 27 is a block diagram illustrating an example computing device that may be used in at least some embodiments.

FIG. 27 illustrates such a general-purpose computing device 2700 as may be used in any of the embodiments described herein. In the illustrated embodiment, computing device 2700 includes one or more processors 2710 coupled to a system memory 2720 (which may comprise both non-volatile and volatile memory modules) via an input/output (I/O) interface 2730. Computing device 2700 further includes a network interface 2740 coupled to I/O interface 2730.

In various embodiments, computing device 2700 may be a uniprocessor system including one processor 2710, or a multiprocessor system including several processors 2710 (e.g., two, four, eight, or another suitable number). Processors 2710 may be any suitable processors capable of executing instructions. For example, in various embodiments, processors 2710 may be general-purpose or embedded processors implementing any of a variety of instruction set architectures (ISAs), such as the x86, PowerPC, SPARC, or MIPS ISAs, or any other suitable ISA. In multiprocessor systems, each of processors 2710 may commonly, but not necessarily, implement the same ISA. In some implementations, graphics processing units (GPUs) may be used instead of, or in addition to, conventional processors.

System memory 2720 may be configured to store instructions and data accessible by processor(s) 2710. In at least some embodiments, the system memory 2720 may comprise both volatile and non-volatile portions; in other embodiments, only volatile memory may be used. In various embodiments, the volatile portion of system memory 2720 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 2720 as code 2725 and data 2726.

In some embodiments, I/O interface 2730 may be configured to coordinate I/O traffic between processor 2710, system memory 2720, and any peripheral devices in the device, including network interface 2740 or other peripheral interfaces such as various types of persistent and/or volatile storage devices. In some embodiments, I/O interface 2730 may perform any necessary protocol, timing or other data transformations to convert data signals from one component (e.g., system memory 2720) into a format suitable for use by another component (e.g., processor 2710). In some embodiments, I/O interface 2730 may include support for devices attached through various types of peripheral buses, such as a variant of the Peripheral Component Interconnect (PCI) bus standard or the Universal Serial Bus (USB) standard, for example. In some embodiments, the function of I/O interface 2730 may be split into two or more separate components, such as a north bridge and a south bridge, for example. Also, in some embodiments some or all of the functionality of I/O interface 2730, such as an interface to system memory 2720, may be incorporated directly into processor 2710.

Network interface 2740 may be configured to allow data to be exchanged between computing device 2700 and other devices 2760 attached to a network or networks 2750, such as other computer systems or devices as illustrated in FIG. 1 through FIG. 26, for example. In various embodiments, network interface 2740 may support communication via any suitable wired or wireless general data networks, such as types of Ethernet network, for example. Additionally, network interface 2740 may support communication via telecommunications/telephony networks such as analog voice networks or digital fiber communications networks, via storage area networks such as Fibre Channel SANs, or via any other suitable type of network and/or protocol.

In some embodiments, system memory 2720 may represent one embodiment of a computer-accessible medium configured to store at least a subset of program instructions and data used for implementing the methods and apparatus discussed in the context of FIG. 1 through FIG. 26. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 2700 via I/O interface 2730. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 2700 as system memory 2720 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 2740. Portions or all of multiple computing devices such as that illustrated in FIG. 27 may be used to implement the described functionality in various embodiments; for example, software components running on a variety of different devices may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A method of aligning optical elements, the method comprising:

attaching a first set of optical elements to a platform of an alignment device, wherein the platform is configured to move in 3D space, and wherein each of the optical elements of the first set are individually attached to the platform via respective ones of a plurality of electrically-controlled mounts mounted on the platform;

manipulating the platform with the first set of optical elements attached such that tapered ends of the first set of optical elements are positioned adjacent to, or touching, tapered ends of a second set of optical elements to which the first set of optical elements are to be coupled; and individually adjusting, using the respective ones of the electrically-controlled mounts, positioning of respective ones of the tapered ends of the first set of optical elements to align the respective ones of the tapered ends of the first set of optical elements with the tapered ends of the second set of optical elements.

2. The method of claim 1, wherein:

said manipulating the platform adjusts the positioning of the tapered ends of the first set of optical elements according to a first precision level;

said individually adjusting the respective ones of the tapered ends via the electrically-controlled mounts adjusts the positioning of the respective ones of the tapered ends of the first set of optical elements according to a second precision level; and the second precision level enables adjustments that are an order of magnitude smaller than are enabled at the first precision level.

3. The method of claim 2, wherein the second precision level enables adjustments in positioning in a 2D plane orthogonal to the platform in increments of approximately 500 nanometers or less.

4. The method of claim 1, wherein the electrically-controlled mounts comprise a piezoelectric material or an electrostatic device configured to individually adjust the positioning of the respective ones of the tapered ends of the first set of optical elements.

5. The method of claim 1, wherein said manipulating the platform comprises adjusting a positioning of the platform relative to the tapered ends of the second set of optical elements:

in a vertical direction, in a horizontal direction, or in a depth direction.

6. The method of claim 5, wherein said manipulating the platform comprises adjusting a positioning of the platform relative to the tapered ends of the second set of optical elements:

about an X-axis, about a Y-axis, or about a Z axis.

7. The method of claim 1, wherein:

a first stage of the method of aligning the optical elements comprises said manipulating the platform to adjust a pitch, roll, and yaw of the platform and to adjust a placement of the platform vertically, horizontally, and depth-wise with respect to the second set of optical elements; and a second stage of the method of aligning the optical elements comprises said individually adjusting the positioning of the respective ones of the tapered ends of the first set of optical elements in a 2D plane while the platform is held stationary.

8. The method of claim 1, further comprising:

capturing images of relative positioning of the tapered ends of the first set of optical elements relative to the second set of optical elements; and determining, via machine vision using the captured images, one or more platform movements to be performed as part of said manipulating the platform.

9. D) The method of claim 8, wherein the machine vision is configured to determine:

a taper shape of the tapered ends of the first set of optical elements and a tapered shape of the tapered ends of the second set of optical elements;

a taper location of the tapered ends of the first set of optical elements and a taper location of the tapered ends of the second set of optical elements; or a taper angle of the tapered ends of the first set of optical elements and a taper angle of the tapered ends of the second set of optical elements.

10. The method of claim 8, further comprising:

emitting light into the first or second set of optical elements, wherein the captured images show light leakage or light scattering from the tapered ends of the first or second set of optical elements, wherein the machine vision uses the light leakage or light scattering shown in the captured images to determine the one or more platform movements to be performed.

11. The method of claim 1, further comprising:

transmitting light signals from a transmitting device to a receiving device via the adjacently positioned first and second sets of optical elements; and determining, based on measured signal characteristics, individual optical element adjustments to be performed via the electrically-controlled mounts.

12. The method of claim 1, wherein the method of aligning the optical elements results in an adiabatic coupling of the respective ones of the tapered ends of the first set of optical elements with the tapered ends of the second set of optical elements.

13. The method of claim 1, further comprising:

securing, a given optical element of the first or second sets of optical elements to a structure of an optical device that includes the given optical element, wherein said securing is performed by applying an adhesive to the given optical element to secure it to the structure of the optical device.

14. The method of claim 13, further comprising:

immersing the first and second sets of optical elements that have been aligned and at least partially secured via respective adhesives in a photo-active liquid polymer; and forming additional respective securing structures over the aligned tapered ends of the first and second sets of optical elements by applying photons of light to the photo-active liquid polymer to form the additional respective securing structures.

15. The method of claim 1, wherein the first or second sets of optical elements are part of:

a diamond optical device;

a lithium niobate optical device;

an aluminum nitride optical device;

a silicon optical device;

a silicon nitride optical device; or a fiber optic cable.

\* \* \* \* \*